US012651057B2

(12) United States Patent
Deschamp

(10) Patent No.: US 12,651,057 B2
(45) Date of Patent: Jun. 9, 2026

(54) MONITORING FILE SYSTEM OPERATIONS USING eBPF DFA ARCHITECTURE

(71) Applicant: CrowdStrike, Inc., Sunnyvale, CA (US)

(72) Inventor: Justin John Kevin Deschamp, Ottawa (CA)

(73) Assignee: CrowdStrike, Inc., Sunnyvale, CA (US)

( * ) Notice: Subject to any disclaimer, the term of this patent is extended or adjusted under 35 U.S.C. 154(b) by 215 days.

(21) Appl. No.: 18/495,646

(22) Filed: Oct. 26, 2023

(65) Prior Publication Data

US 2025/0139227 A1    May 1, 2025

(51) Int. Cl.
*G06F 21/00* (2013.01)
*G06F 21/52* (2013.01)

(52) U.S. Cl.
CPC ........ *G06F 21/52* (2013.01); *G06F 2221/033* (2013.01)

(58) Field of Classification Search
CPC .. G06F 21/52; G06F 2221/033; G06F 21/554; G06F 21/566
See application file for complete search history.

(56) References Cited

U.S. PATENT DOCUMENTS

| | | | |
|---|---|---|---|
| 7,904,961 | B2 | 3/2011 | Ma et al. |
| 7,962,434 | B2 | 6/2011 | Estan et al. |
| 9,083,740 | B1 | 7/2015 | Ma et al. |
| 10,229,104 | B2 | 3/2019 | Cheetancheri et al. |
| 10,462,173 | B1 | 10/2019 | Aziz et al. |
| 2016/0191550 | A1 | 6/2016 | Ismael et al. |
| 2020/0174976 | A1* | 6/2020 | Viswanath .......... G06F 16/1805 |
| 2022/0279013 | A1 | 9/2022 | Qiu et al. |
| 2023/0096108 | A1 | 3/2023 | Malanov et al. |
| 2023/0231830 | A1* | 7/2023 | Shin .................... H04L 63/0245 726/1 |
| 2025/0030714 | A1* | 1/2025 | Xu ........................ H04L 63/162 |

* cited by examiner

*Primary Examiner* — Ghazal B Shehni
(74) *Attorney, Agent, or Firm* — Law Office of Scott P. Zimmerman, PLLC

(57) ABSTRACT

A deterministic finite automata (DFA) is used by an extended Berkley packet filter (or "eBPF") to monitor file system operations and non-file system operations. The DFA is stored as an eBPF map. Before a kernel of an operating system executes any file system operation, the kernel runs an eBPF program that queries the DFA for a filename associated with the system operation. The DFA represents safe/suspicious filenames associated with computer files. If the filename matches the DFA, then the kernel notifies a cybersecurity agent. The cybersecurity agent may then block or allow the file system operation, depending on whether the filename is safe or suspicious. The DFA stored in the extended BPF thus greatly improves computer functioning by very quickly and simply identifying safe/suspicious operations.

20 Claims, 24 Drawing Sheets

[abc]abc — 102b

| State \ Symbol | a | b | c |
|---|---|---|---|
| 0 | (s, 1) | (s, 1) | (s, 1) |
| 1 | (s, 2) | (f, -) | (f, -) |
| 2 | (f, -) | (s, 3) | (f, -) |
| 3 | (f, -) | (f, -) | (s, 4) |
| 4 | (s, -) | (s, -) | (s, -) |

FIG. 9

```
fn match_string(symbol_table, state_table, string) -> bool
{
    state = 0
    for c in string {
        s = lookup_symbol(symbol_table, c)
        (fail, next_state) = lookup_edge(state_table, (state, s))
        if fail {
            return false;
        }
        state = next_state
    }

(fail, _) = lookup_edge(state_table, (state, 0))
    return fail
}
```

| File System Operation | DFA |
|---|---|
| Open | DFA1 |
| Close | DFA2 |
| Delete | DFA3 |
| Rename | DFA4 |
| Read | DFA5 |
| Copy | DFA6 |

Database of DFA

MONITORING FILE SYSTEM OPERATIONS USING eBPF DFA ARCHITECTURE

BACKGROUND

The subject matter described herein generally relates to computers and, more particularly, the subject matter relates to program control, execution of specific programs, finite state machines, and security monitoring arrangements.

Cybersecurity attacks are increasing. Nearly every day we read of another virus, hack, or malware. Some of these cybersecurity attacks involve file system operations. When a computer system opens a file, for example, the file may contain malicious code. The malicious code seeks to steal or destroy passwords, social security numbers, and other valuable/personal information. Many cybersecurity products have thus tried to scan every file being opened for the presence of malicious code, but scanning every file is too slow to be effective. Moreover, today's sophisticated software packages may open hundreds or even thousands of files, thus making conventional file scanning schemes impractical.

SUMMARY

An elegant eBPF DFA architecture greatly improves computer functioning. A deterministic finite automata (or "DFA") is used by an extended Berkley packet filter (or "eBPF") to monitor file system operations. The DFA is stored as an eBPF map. Before a kernel of an operating system executes any file system operation (such as opening, closing, or renaming a computer file), the eBPF queries the DFA for a filename associated with the file system operation. The DFA may represent whitelist/blacklist or safe/suspicious filenames associated with computer files. If the filename matches the DFA, then the kernel may notify a cybersecurity agent of the filename and the file system operation. The cybersecurity agent may then implement any action or response, such as tracking/monitoring additional operations for more suspicious activities. Indeed, the cybersecurity agent may even block or allow the file system operation, depending on whether the filename is safe or suspicious. The kernel may also query the DFA for filenames associated with the non-file system operations, such as safe/suspicious software applications, safe/suspicious memory usage, and safe/suspicious networking operations. The DFA stored in the eBPF map greatly improves computer functioning by very quickly and simply identifying safe/suspicious operations.

BRIEF DESCRIPTION OF THE SEVERAL VIEWS OF THE DRAWINGS

The features, aspects, and advantages of eBPF DFA architecture are understood when the following Detailed Description is read with reference to the accompanying drawings, wherein:

FIGS. 2-3 illustrate examples of the eBPF DFA architecture;

FIGS. 4-5 illustrate examples of cybersecurity services;

FIGS. 6-9 illustrate examples of a deterministic finite automata (or "DFA");

FIGS. 12-14 illustrate more examples of the DFA;

FIGS. 15-16 illustrate examples of runtime populations

DETAILED DESCRIPTION

Figure 1:
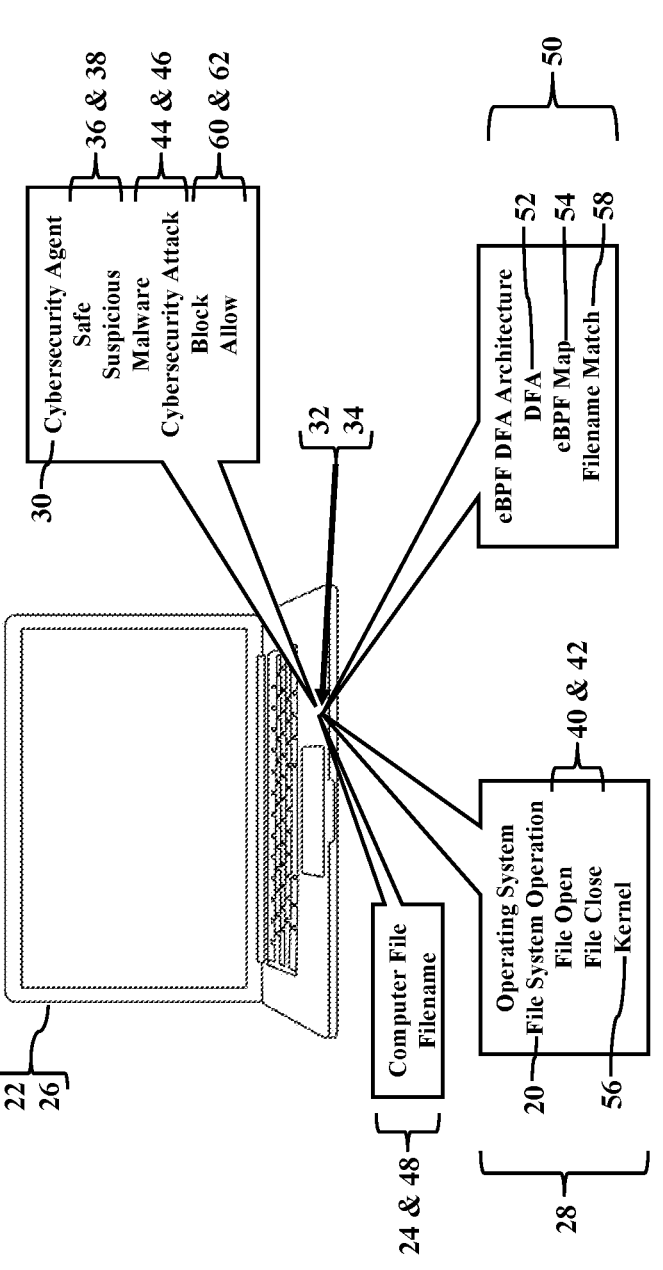
FIG. 1 illustrates some examples of monitoring for file system operations using the eBPF DFA architecture.

Some examples relate to detection of suspicious computer operations. Nearly every day we read of yet another hack into a computer system. Hackers can steal passwords, social security numbers, photos, and other personal information. Hackers can even steal money from our bank accounts. These hackers usually trick an innocent user into clicking some nefarious link that downloads malicious software. The malicious software then opens, copies, or transfers computer files that contain personal information. This disclosure describes an eBPF DFA architecture that catches and stops hacks before information is stolen. The eBPF DFA architecture intercepts any file system operation before execution. That is, before any computer file is opened, copied, or transferred from the computer system, the eBPF DFA architecture first checks the filename against safe/suspicious filenames associated with good/bad computer files. If the filename corresponds to a good or safe computer file, then the eBPF DFA architecture may allow an operating system to perform the file system operation (e.g., open, copy, or transfer). If, however, the filename corresponds to an unknown, suspicious, or even known cybersecurity attack, then the eBPF DFA architecture may instruct the operating system to monitor/track additional operations or even block the file system operation. The eBPF DFA architecture, in other words, stops malicious software from opening files and stealing personal information.

The eBPF DFA architecture is an elegant cybersecurity solution. When the eBPF DFA architecture compares filenames to safe/suspicious filenames, the eBPF DFA architecture uses a deterministic finite automata (or "DFA") stored as an extended Berkley packet filter (or "eBPF") map. The DFA is a state machine that very quickly and sequentially compares each character in the filename (such as "f-i-l-e-n-a-m-e"). Even though there may be thousands of safe/suspicious filenames to check, the DFA is so fast as to be often humanly imperceptible in delay. Moreover, because the DFA is stored as the eBPF map, the DFA may be hooked or attached to the file system operations executed by a kernel of the operating system. So, when any software application calls for a file system operation involving a filename, the kernel may first query the DFA stored as the eBPF map. If the DFA determines that the filename is safe, then the kernel may proceed with the file system operation. If, however, the DFA determines that the filename corresponds to an unknown, suspicious, or even known cybersecurity attack, then the eBPF DFA architecture may instruct the kernel to stop/block the file system operation. The eBPF DFA architecture stops file system operations requested by hackers.

The eBPF DFA architecture will now be described more fully hereinafter with reference to the accompanying drawings. The eBPF DFA architecture, however, may be embodied and implemented in many different forms and should not be construed as limited to the examples set forth herein. These examples are provided so that this disclosure will be thorough and complete and fully convey the eBPF DFA architecture to those of ordinary skill in the art. Moreover, all the examples of the eBPF DFA architecture are intended to encompass both structural and functional equivalents thereof. Additionally, it is intended that such equivalents include both currently known equivalents as well as equivalents developed in the future (i.e., any elements developed that perform the same function, regardless of structure).

FIG. 1 illustrates some examples of monitoring for file system operations 20. A computer system 22 is programmed to monitor any file system operation 20 associated with a computer file 24. FIG. 1 illustrates the computer system 22 as a laptop computer 26, but the computer system 22 may be any processor-controlled device (as later paragraphs will explain). The laptop computer 26 stores an operating system 28. The laptop computer 26 also stores a cybersecurity agent 30. The operating system 28 and the cybersecurity agent 30 are both stored in a memory device 32. The laptop computer 26 has a hardware processor 34 that reads and executes the operating system 28 and the cybersecurity agent 30. The cybersecurity agent 30 has programming code or instructions that cause the hardware processor 34 to perform operations, such as determining if the computer file 24 is categorized as safe 36 or suspicious 38. If the cybersecurity agent 30 determines that the computer file 24 is safe 36, then the cybersecurity agent 30 may approve the file system operations 20 associated with the computer file 24. The cybersecurity agent 30, in other words, may approve, authorize, or recommend a file open 40, a file close 42, or any other file system operation 20 involving the computer file 24. If, however, the cybersecurity agent 30 determines that the computer file 24 is suspicious 38 or even known malicious software (or "malware") 44, then the cybersecurity agent 30 may refuse the file system operations 20 associated with the computer file 24. The cybersecurity agent 30 may thus deny or recommend against the file open 40, the file close 42, or any other file system operation 20 involving the computer file 24. The cybersecurity agent 30 may even warn or notify of a cybersecurity attack 46 involving the computer file 24.

Conventional file monitoring schemes are too slow. Conventional file monitoring schemes attempt to scan or check every computer file being opened, closed, deleted, or otherwise accessed. Conventional file monitoring schemes attempt to compare a filename 48 associated with the computer file 24 to a whitelist/blacklist of filenames associated with known good/bad/safe/malicious filenames. However, because today's software packages are very sophisticated, the whitelist/blacklist often contains thousands of filenames. Conventional file monitoring schemes simply take too long to iterate through thousands of filenames. Indeed, the operating system 28 often rejects such complex and time-consuming file monitoring schemes in the context of eBPF as too burdensome to execute.

In FIG. 1, though, the computer system 22 implements an elegant eBPF DFA architecture 50. A deterministic finite automata (or "DFA") 52 is used when monitoring the file system operations 20. The DFA 52 is stored as an extended Berkley packet filter (or "eBPF") map 54. Before a kernel 56 of the operating system 28 executes any file system operation 20, the kernel 56 may query the eBPF DFA architecture 50 for the filename 48 associated with the file system operation 20. The DFA 52, in simple words, represents whitelist/blacklist or safe/suspicious filenames associated with different computer files. If the eBPF DFA architecture 50 determines that the filename 48 matches the DFA 52, then the eBPF DFA architecture 50 reports a filename match 58 to the kernel 56. The kernel 56 may then notify the cybersecurity agent 30. The cybersecurity agent 30 may then block 60 or allow 62 the file system operation 20, depending on whether the filename match 58 is categorized as the safe 36 or suspicious 38, the known malware 44, and/or even the cybersecurity attack 46.

Figure 2:
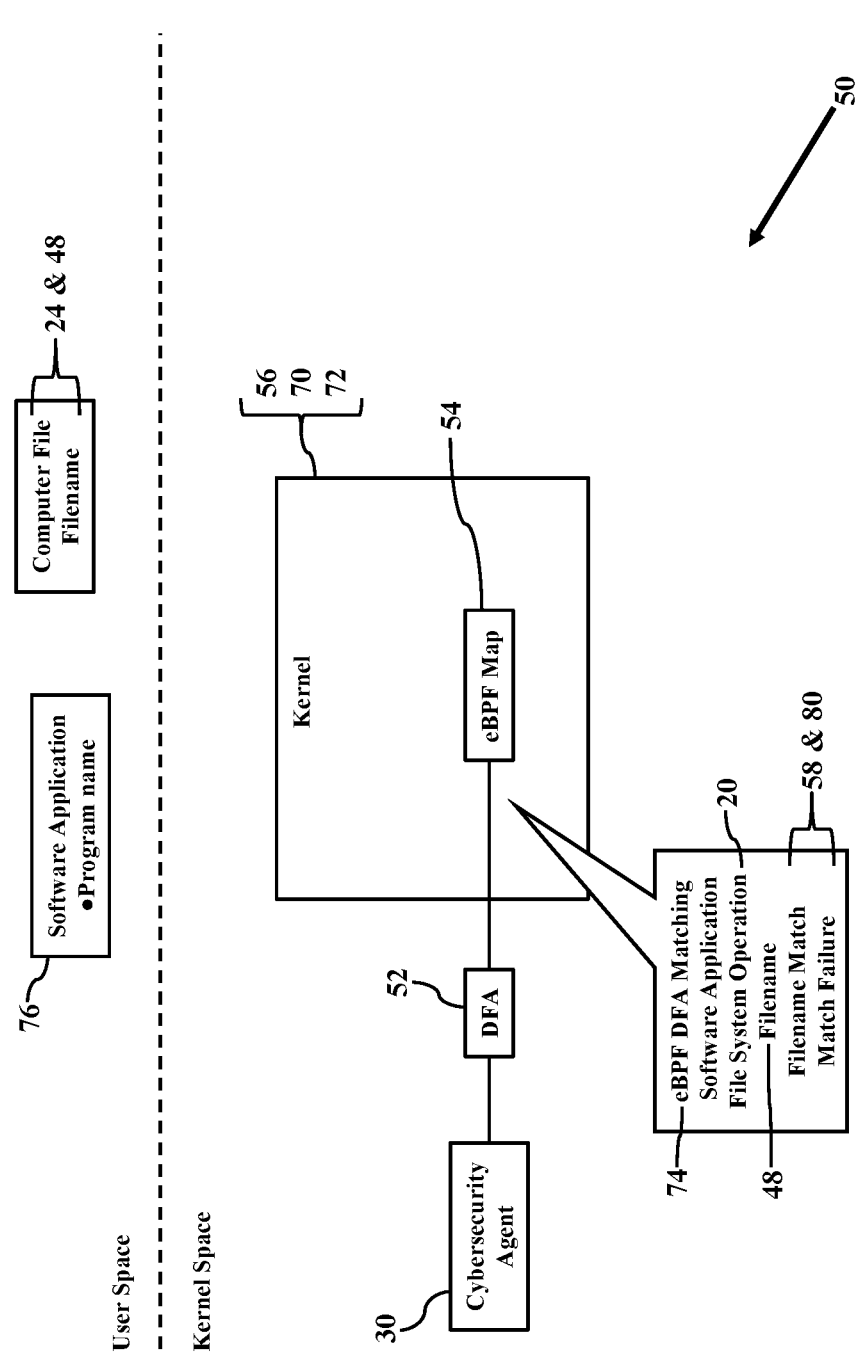
Figure 3:
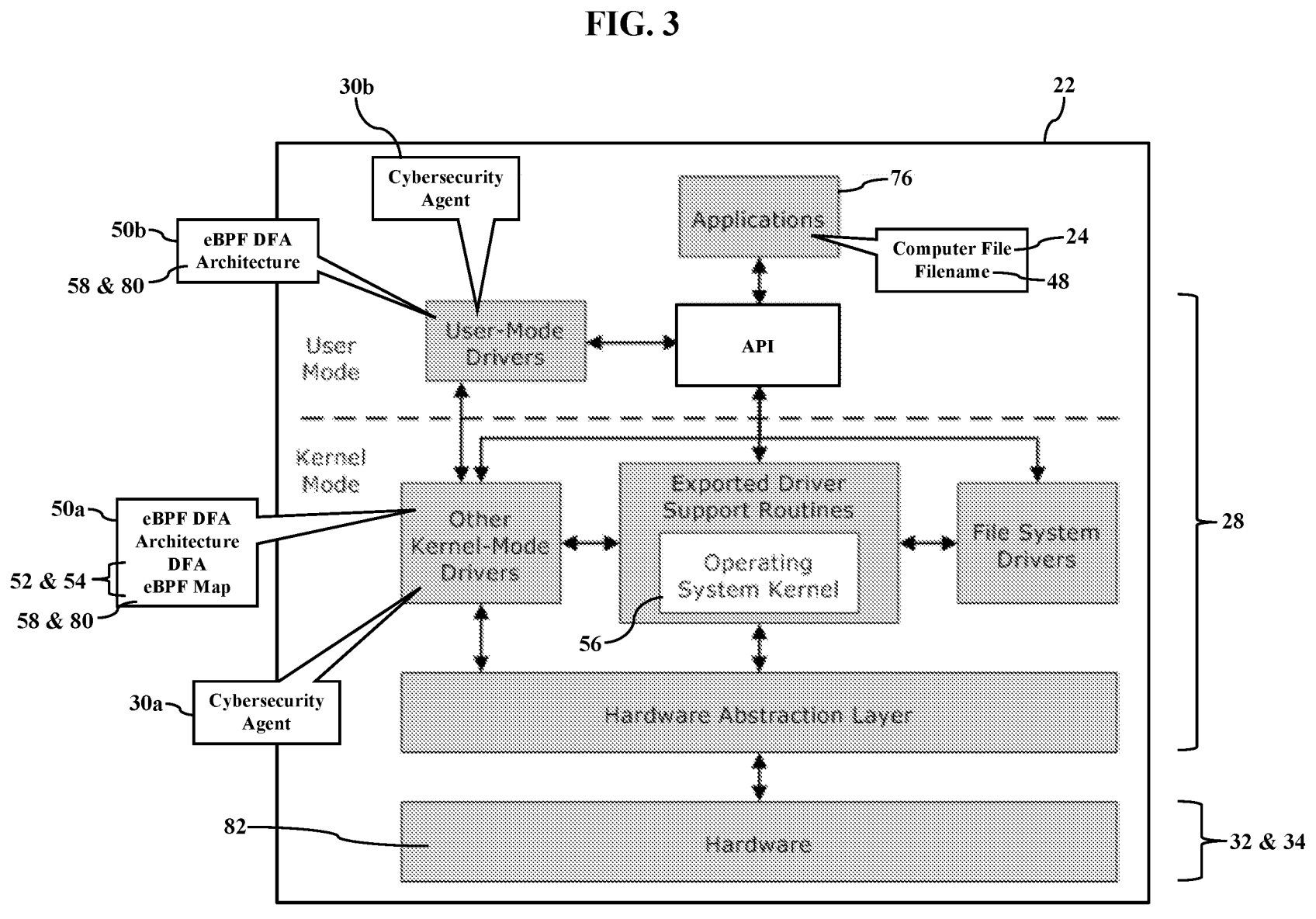

FIGS. 2-3 illustrate more detailed examples of the eBPF DFA architecture 50. The eBPF DFA architecture 50 stores the deterministic finite automata (or "DFA") 52 as the extended Berkley packet filter (or "eBPF") map 54. The eBPF DFA architecture 50 may be implemented regardless of processor mode of operation. FIG. 2, for example, illustrates a kernel mode implementation. Because the cybersecurity agent 30 has kernel-level permissions to the kernel 56 of the operating system 28, the cybersecurity agent 30 interfaces with the kernel 56 and instructs the kernel 56 to store the DFA 52 in, at, or as the eBPF map 54. The eBPF DFA architecture 50 may be coded or resourced as a virtual machine 70 that provides or implements a filename inspection engine 72. The cybersecurity agent 30 also instructs the kernel 56 to store and execute an eBPF DFA matching software application 74 as a component of the filename inspection engine 72. The eBPF DFA matching software application 74 has programming code or instructions that cause the filename inspection engine 72, the virtual machine 70, and/or the hardware processor (illustrated as reference numeral 34 in FIG. 1) to perform operations, such as querying the DFA 52 in response to the file system operation 20. When any software application 76 requests that the kernel 56 perform the file system operation 20, the kernel 56 may pause, defer, or interrupt the file system operation 20 and execute the filename inspection engine 72. The kernel 56 notifies the filename inspection engine 72 (such as the eBPF DFA matching software application 74) of the filename 48 associated with the file system operation 20. When the filename inspection engine 72 receives the filename 48, the eBPF DFA matching software application 74 compares or queries the DFA 52 for bit characters in the filename 48 associated with the file system operation 20. The eBPF DFA matching software application 74, in simple words, performs a linear run over the DFA 52 using a bit string representing the filename 48.

As FIG. 3 illustrates, the cybersecurity agent 30 and the eBPF DFA architecture 50 may execute in either mode. The computer system 22 has the hardware processor 34 that executes the operating system 28 stored in the memory device 32. The kernel 56 of the operating system 28 controls utilization and access to the hardware resources 32 and 34. The hardware processor 34 and/or the operating system 28 thus have the kernel mode and the user mode, and the hardware processor 34 switches between these two modes depending on what type of code is running/executing on the hardware processor 34. The kernel 56 of the operating system 28, for example, loads and runs in the kernel mode that provides a protected kernel space or portion of the memory device 32. Some software applications 76 store and execute from the user space of the memory device 32 associated with the user mode.

The cybersecurity agent 30 may have kernel-mode components 30a having kernel permissions to the kernel mode. The cybersecurity agent 30 may also have user-mode components 30b in the user mode. The cybersecurity agent 30 may even load before the operating system 28, perhaps very early in the boot-time of the computer system 22. The cybersecurity agent 30 may be installed in the form of a driver (perhaps received from a remote cloud computing environment). Because the cybersecurity agent 30 may have the kernel-mode components 30a having kernel permissions to the kernel mode, the cybersecurity agent 30 may have kernel permissions to instrument/monitor/intercept functions, system calls, and other operations in the kernel mode. Moreover, because the cybersecurity agent 30 may also have the user-mode components 30b, the cybersecurity agent 30 may also instrument/monitor/intercept functions, system calls, and other operations in the user mode. The cybersecurity agent 30 may thus interface with the operating system 28 and with other software applications 76 to receive any data (such as runtime values, messages, input/output requests, system calls, reads/writes, launches, files, and memory allocations), as later paragraphs will explain.

The eBPF DFA architecture 50 may have kernel-mode components 50a and user-mode components 50b. The eBPF DFA architecture 50 may thus have having kernel permissions to the kernel mode. The eBPF DFA architecture 50 may also have the user-mode components 50b in the user mode. The eBPF DFA architecture 50 may load before the operating system 28, perhaps very early in the boot-time of the computer system 22. Because the eBPF DFA architecture 50 may have the kernel-mode components 50a having kernel permissions to the kernel mode, the eBPF DFA architecture 50 may have kernel permissions to instrument/monitor/intercept functions, system calls, and other operations in the kernel mode. Moreover, because the eBPF DFA architecture 50 may also have the user-mode components 50b, the eBPF DFA architecture 50 may also instrument/monitor/intercept functions, system calls, and other operations in the user mode. The eBPF DFA architecture 50 may thus interface with the operating system 28 and with other software applications 76 to receive any data (such as runtime values, messages, input/output requests, system calls, reads/writes, launches, files, and memory allocations), as later paragraphs will explain.

The eBPF DFA architecture 50 detects filenames of interest. While the eBPF DFA architecture 50 may be used for any bit matching scheme, the eBPF DFA architecture 50 is especially useful for cybersecurity services. The deterministic finite automata (or "DFA") 52 represents or encodes many different filename characters representing whitelist/blacklist/safe/suspicious filenames 48 associated with different computer files 24. The filename inspection engine 72 may thus quickly and simply compare the bit string representing the filename 48 (such as specified by a query from the kernel 56) to the DFA 52. If the bit string representing the filename 48 linearly traverses the DFA 52, then the eBPF DFA matching software application 74 may determine the filename match 58 between the filename 48 and the DFA 52 stored in the extended Berkley Packet Filter (or "eBFA") map 54. The eBPF DFA matching software application 74 may notify the kernel 56 of the filename match 58 between the filename 48 and the DFA 52. If, however, the bit string representing the filename 48 does not linearly traverse the DFA 52, then the DFA 52 may reject the filename 48 and the eBPF DFA matching software application 74 determines a match failure 80. While the eBPF DFA architecture 50 may implement any action or response to the match failure 80, in these examples the eBPF DFA matching software application 74 may take no action, or the eBPF DFA matching software application 74 may report the rejection or match failure 80 to the kernel 56 and/or the cybersecurity agent 30.

Any notification scheme, mechanism, or standard may be used. When the eBPF DFA matching software application 74 notifies the kernel 56 and/or the cybersecurity agent 30 (of the filename match 58 and/or the match failure 80), the eBPF DFA matching software application 74 may use any messages, application programming interfaces, notifications, calls, or any other mechanism. As yet another example, the eBPF DFA matching software application 74 may notify the kernel 56 that there is a message available for the cybersecurity agent 30 using BPF helper functions. The BPF helper functions may be the same mechanism that the cybersecurity agent 30 uses to notify the eBPF DFA matching software application 74 of changes to the DFA 52 (except perhaps by using a different map type). The cybersecurity agent 30 may store the DFA 52 in an array map for the eBPF DFA matching software application 74 to query while the eBPF DFA matching software application 74 sends messages through a ring buffer 82 for the cybersecurity agent 30 to read.

Figure 4:
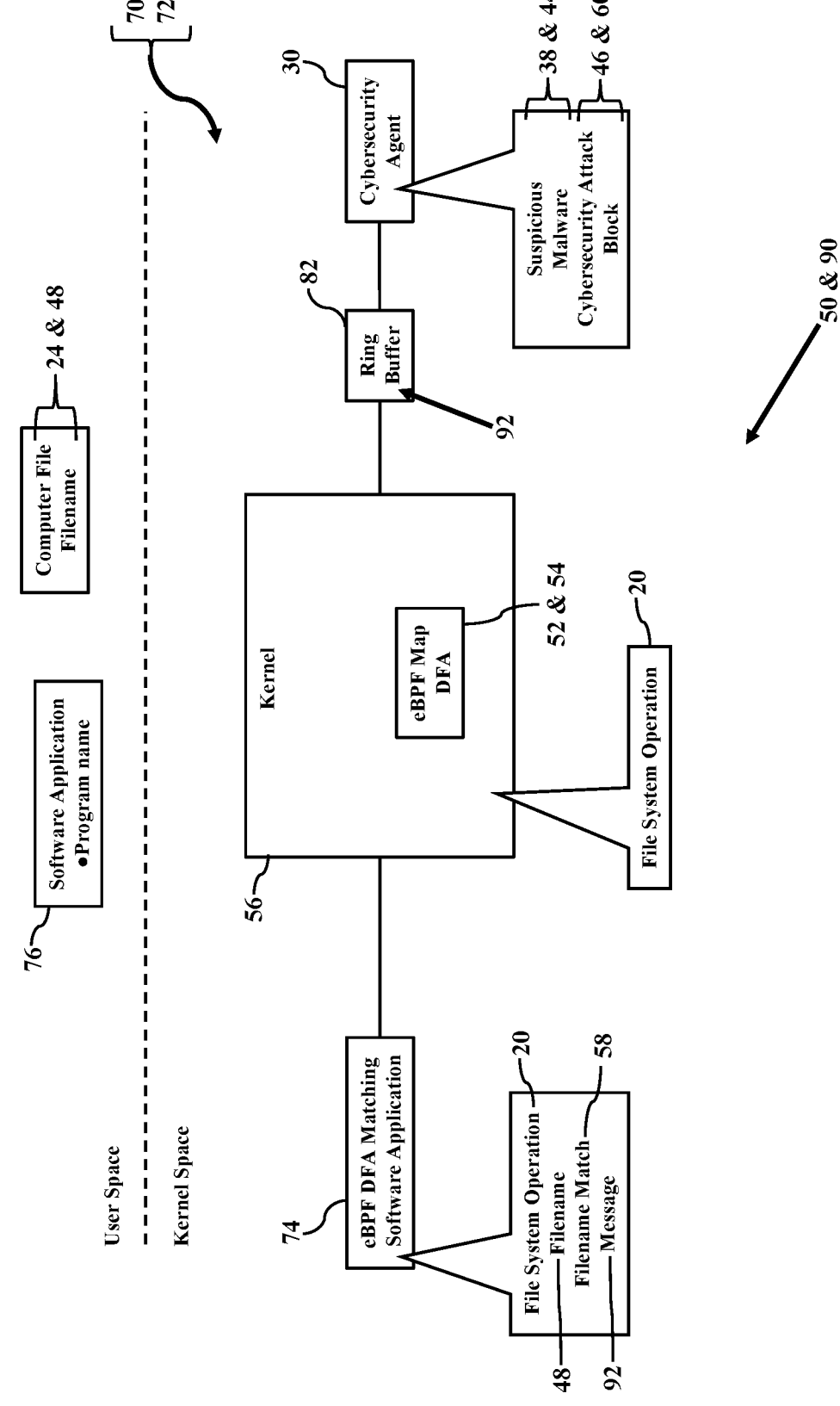
Figure 5:
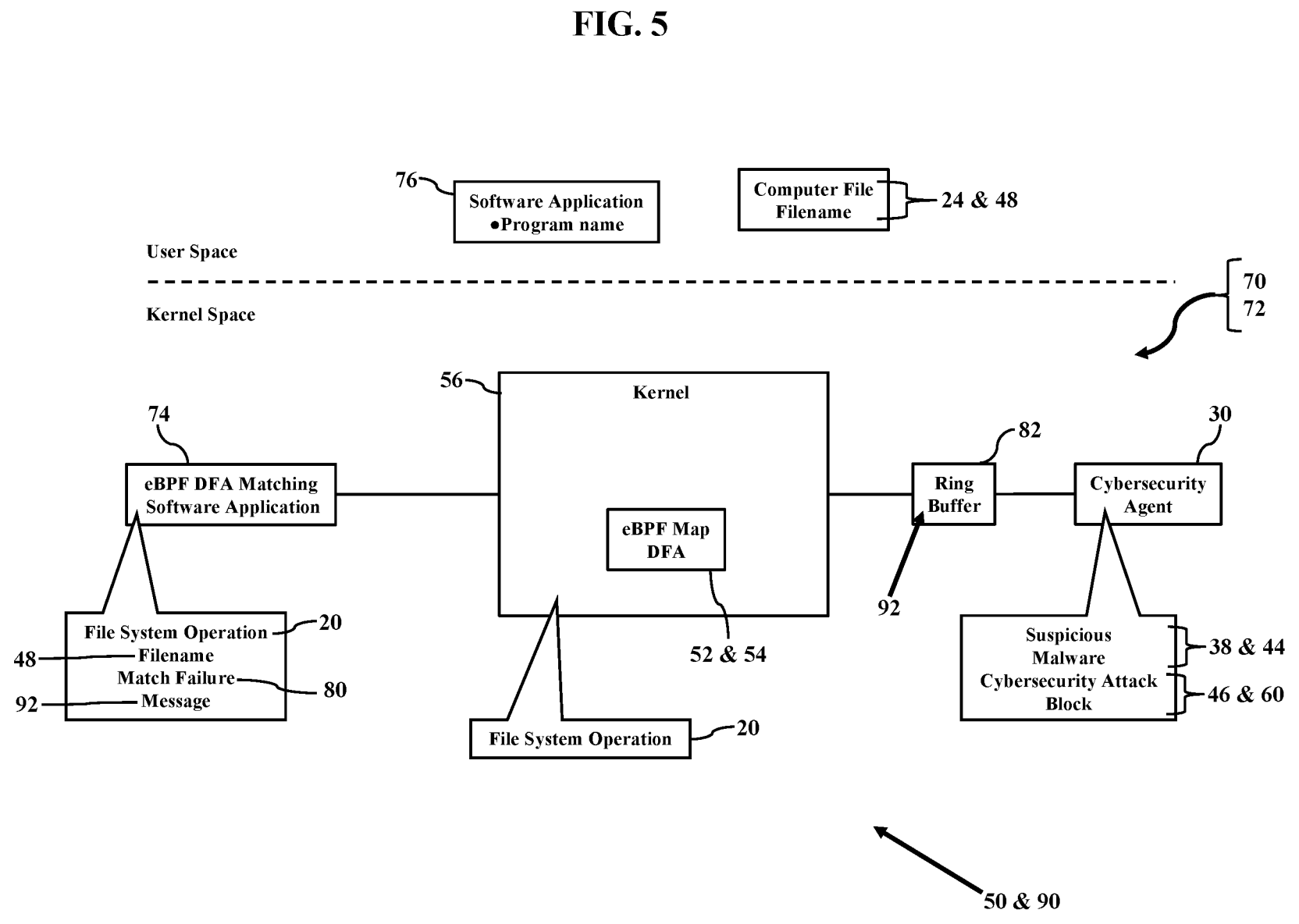

FIGS. 4-5 illustrate examples of cybersecurity services 90. When the eBPF DFA matching software application 74 determines the filename match 58 (e.g., between the filename 48 and the deterministic finite automata (or "DFA") 52 stored in the extended Berkley Packet Filter (or "BPF") map 54), the eBPF DFA matching software application 74 may generate a message 92 and send the message 92 to the kernel 56. The kernel 56 may interface with the cybersecurity agent 30 and queue or store the message 92 (such as via the ring buffer 82) for the cybersecurity agent 30. When the cybersecurity agent 30 reads, retrieves, or otherwise receives the message 92, the message 92 alerts the cybersecurity agent 30 to the file system operation 20 associated with the filename 48 of the computer file 24 that matched, or failed to match, the DFA 52 stored in the BPF map 54. For example, if the DFA 52 represents filenames of known bad/unsafe/harmful computer files, then the filename match 58 indicates that the corresponding computer file 24 is suspicious, potentially unsafe, and perhaps evidence of the cybersecurity attack 46. The cybersecurity agent 30 may thus categorize the computer file 24 as the malware 44 and implement additional cybersecurity procedures. As yet another example, because the filename 48 matched the DFA 52 representing known bad/unsafe/harmful computer files, the cybersecurity agent 30 may instruct the kernel 56 to monitor or track subsequent activities as further evidence of the cybersecurity attack 46. The cybersecurity agent 30 may even instruct the kernel 56 to block 62 the corresponding file system operation 20 as the cybersecurity attack 46.

FIG. 5 illustrates known safe files. Here the DFA 52 represents filenames 48 of known good/safe/harmless computer files. When the filename inspection engine 72 determines the match failure 80, the eBPF DFA matching software application 74 may generate the message 92 and alert the kernel 56. The kernel 56 may then post the message 92 to the ring buffer 92. The kernel 56 may also notify the cybersecurity agent 30 to the queued/stored message 92 associated with the ring buffer 92. When the cybersecurity agent 30 retrieves the message 92, the message 92 alerts the cybersecurity agent 30 to the file system operation 20 associated with the filename 48 of the computer file 24 that failed to match the DFA 52 stored in the BPF map 54. Because the DFA 52 represents filenames 48 of known good/safe/harmless computer files, then the match failure 80 indicates that the file system operation 20 is unknown, potentially unsafe, and/or possibly evidence of the cybersecurity attack 46. The cybersecurity agent 30 may thus categorize the computer file 24 as the suspicious 38 or even the malware 44 and implement additional cybersecurity procedures 90 (such as the block 60 of the corresponding file system operation 20).

Figure 6:
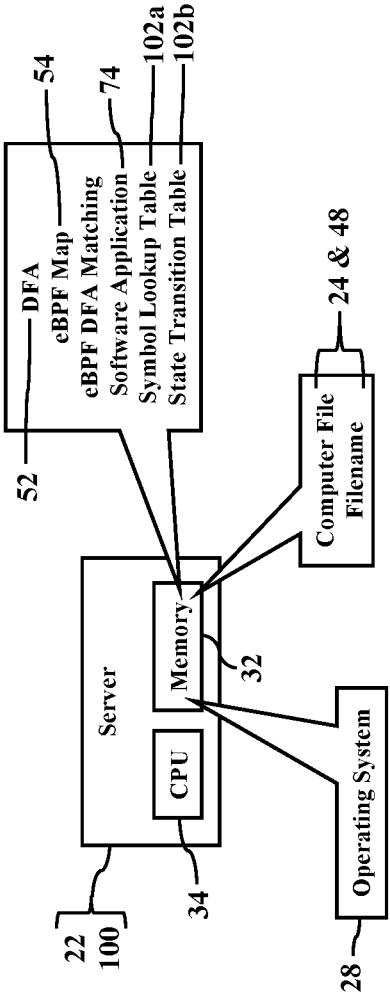

FIGS. 6-9 illustrate more examples of the deterministic finite automata (or "DFA") 52. Because the computer system 22 may be any processor-controlled device, FIG. 6 illustrates the computer system 22 as a server 100. The DFA 52 is stored in the memory device 32, and the DFA 52 may be associated with any portion of the memory device 32 that is dedicated or allocated to the extended Berkley Packet Filter (or "BFA") map 54. The DFA 52 is a finite state machine that accepts or rejects an input (such as the bit string representing the filename 48) by linearly running through a sequence uniquely determined by the filename 48. While the DFA 52 may have any representation, FIG. 6 illustrates tabular representations. The DFA 52 may thus be expressed or represented as one or more tables 102 having row and columnar entries representing different characters, symbols, and/or states. A symbol lookup table 102a, for example, maps 8-bit string or data input characters to 8-bit symbols in the DFA alphabet. A state transition table 102b maps a (state, symbol) tuple to the next state or failure. The eBPF DFA matching software application 74 may thus use the tables 102a and 102b when detecting or matching the filename 48 to filename ontologies.

Figure 7:
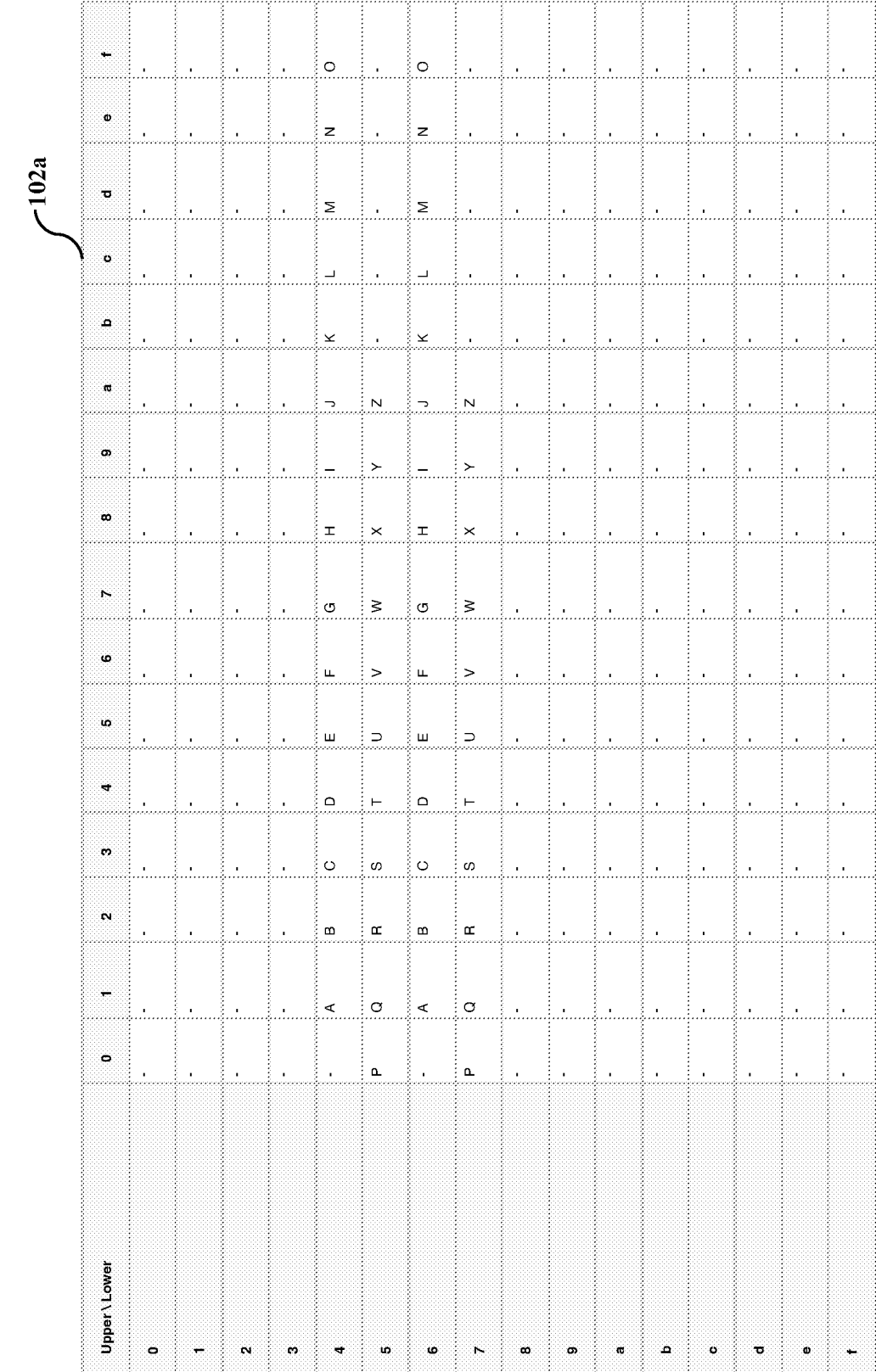

FIGS. 7-9 illustrate still more examples. FIG. 7 illustrates the symbol lookup table 102a. The symbol lookup table 102a is stored in any BPF map (illustrated as reference numeral 54 in FIG. 6) that maps a key to a value. Map keys are elements of the input character set (such as the filename 48 illustrated in FIG. 6) represented as 8-bit values. Map values are elements of the DFA alphabet represented as 8-bit values. FIG. 7 thus illustrates an example of the symbol lookup table 102a for a case insensitive DFA 52 with an alphabet consisting of ASCII symbols from a to z. FIG. 8 illustrates examples of the state transition table 102b. The DFA state transition table 102b is stored in any BPF map 54 (illustrated in FIG. 6) that can map a key to a value. Map keys are a tuple containing a state and an element of the DFA alphabet. Map values are a tuple containing a failure indicator and a potential next state. FIG. 8 thus illustrates an example of the state transition table 102b for any given regular expression (or "regex"). FIG. 9 illustrates examples of the eBPF DFA matching software application 74 as pseudo-code that is easily convertible to efficient BPF code. The eBPF DFA matching software application 74 may perform a single, linear run over the input string and contains minimal branching and logic within the loop block.

Figure 10:
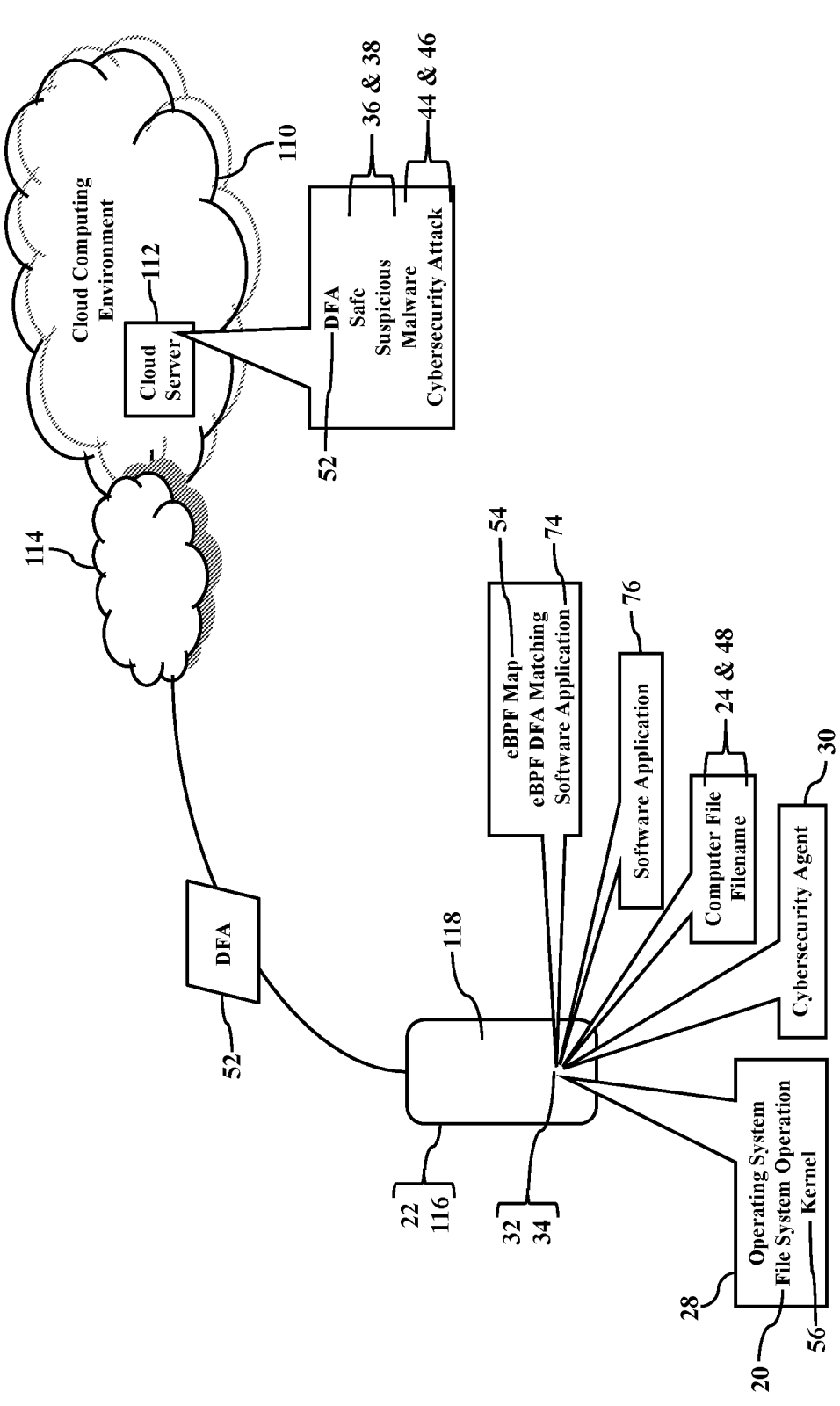
FIG. 10 illustrates examples of cloud generation and sourcing.

FIG. 10 illustrates examples of cloud generation and sourcing. As this disclosure above explained, the DFA 52 represents whitelist/blacklist/safe/suspicious filenames associated with different computer files. When any software application 76 requests that the operating system 28 perform the file system operation 20 associated with the computer file 24, the operating system 28 executes the eBPF DFA matching software application 74 that compares the filename 48 to the deterministic finite automata (or "DFA") 52 stored as the extended Berkley Packet Filter (or "eBFA") map 54. The DFA 52, however, may be very complicated and represent thousands of different filenames 48 associated with thousands of different computer files 24. Because the DFA 52 may be very complicated, the DFA 52 may consume significant hardware resources to generate.

FIG. 10 thus illustrates cloud sourcing and delivery. Because the DFA 52 may be very complicated, the DFA 52 may be generated by one or more network members affiliated with a cloud computing environment 110. As a simple example, suppose a cloud server 112 generates the DFA 52. The cloud computing environment 110, in other words, may evaluate hundreds, thousands, or even millions of computer files and categorize their operation as safe 36, suspicious 38, malware 44, cybersecurity attack 46, and/or any other categorization or label. The cloud computing environment 110 generates one or more DFAs 52 representing the whitelist/blacklist/safe/suspicious filenames associated with different computer files. Once the DFA 52 is defined, the cloud computing environment 110 may deploy the DFA 52 to clients in the field. FIG. 10 thus illustrates the DFA 52 routing via the cloud computing environment 110 and an access communications network 114 to a network address (e.g., IP address) associated with the computer system 22 and/or with the cybersecurity agent 30. Again, because the computer system 22 may be any processor-controlled device, FIG. 10 illustrates the computer system 22 as a mobile smartphone 116. The smartphone 116 has a network interface 118 to the access communications network 114, thus allowing the smartphone 116 to receive the DFA 52. When the smartphone 116 receives the DFA 52, the operating system 28 alerts the cybersecurity agent 30. The cybersecurity agent 30 instructs or requests that the operating system 28 store the DFA 52 to portion of the memory device 32 allocated to the BPF map 54. When any software application 76 then requests or calls the file system operation 20, the kernel 56 executes the eBPF DFA matching software application 74 that compares the filename 48 to the cloud-generated DFA 52 stored as the BFA map 54.

Figure 11:
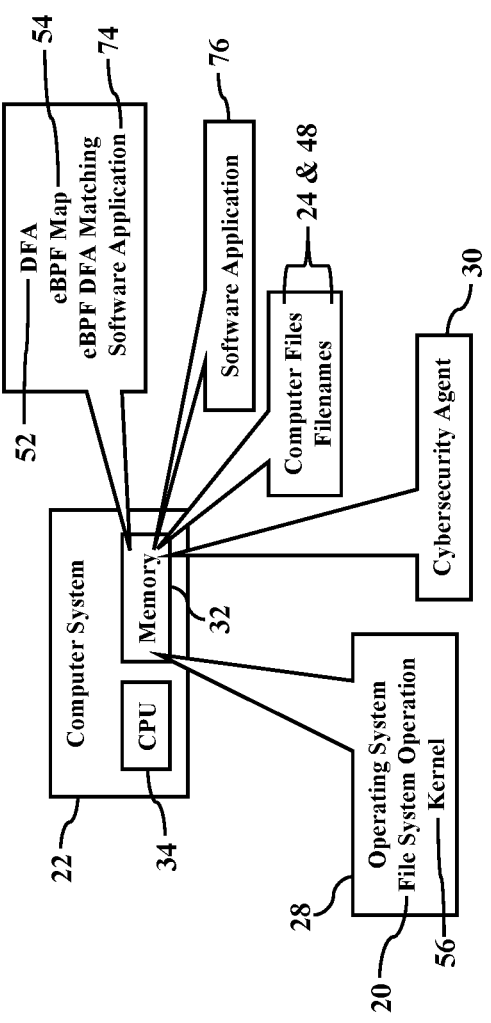
FIG. 11 illustrates examples of local generation.

FIG. 11 illustrates examples of local generation. Even though the deterministic finite automata (or "DFA") 52 may be simple or complicated, the computer system 22 may have adequate hardware resources (e.g., the hardware processor 34 and the memory device 32) to locally generate the DFA 52. While any software component may be downloaded to generate the DFA 52, for simplicity, FIG. 11 illustrates the cybersecurity agent 30. The cybersecurity agent 30 may thus have additional programming code or instructions that generate the DFA 52 to represent whitelist/blacklist/safe/suspicious filenames 48 associated with different computer files 24. Once the DFA 52 is defined, the cybersecurity agent 30 instructs or requests that the operating system 28 (such as the kernel 56) store the DFA 52 to portion of the memory device 32 allocated to the BPF map 54. When any software application 76 then requests or calls the file system operation 20, the kernel 56 executes the eBPF DFA matching software application 74 that compares the filename 48 to the locally-generated DFA 52 stored as the BFA map 54.

Figure 12:
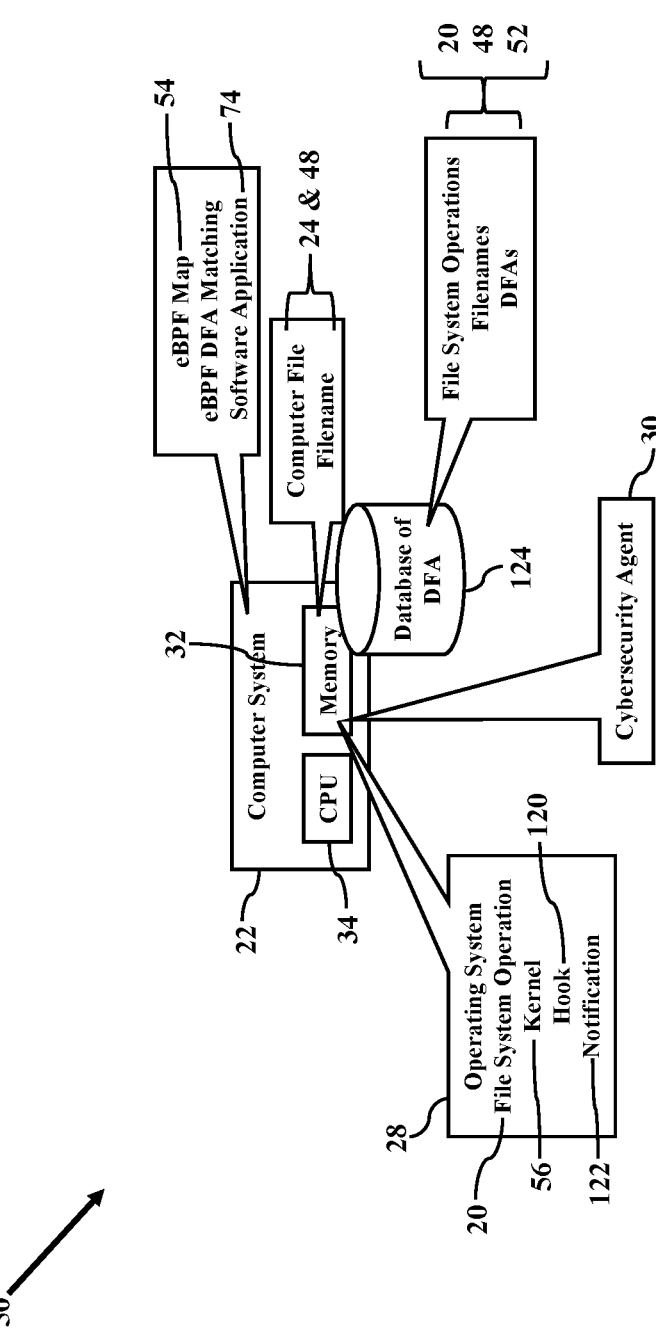
Figure 13:
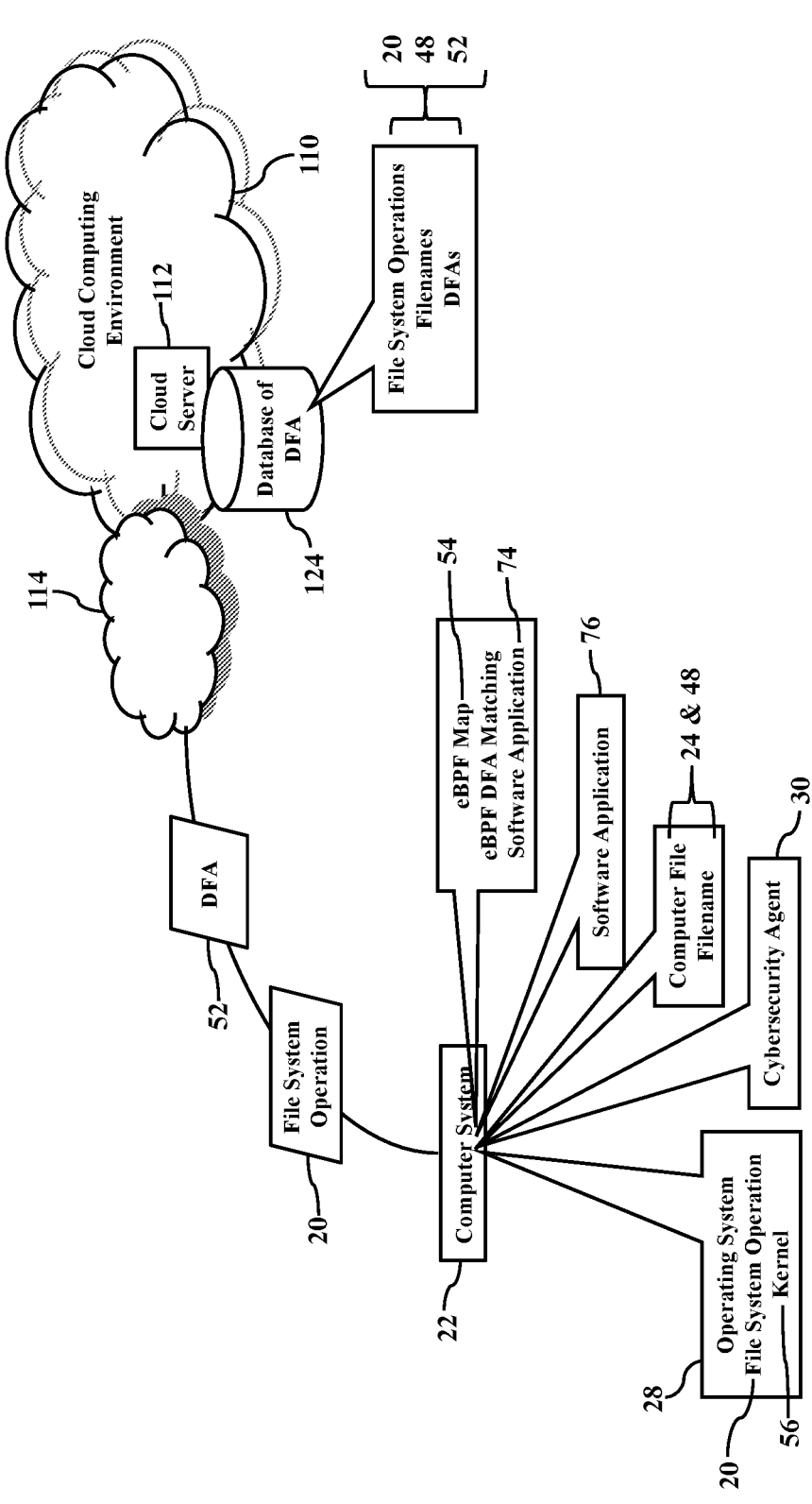

FIGS. 12-14 illustrate more examples of the deterministic finite automata (or "DFA") 52. There are many different file system operations 20, including routines for reading directories and obtaining information about disk files. The operating system 28 may have basic file system operations 20 (such as the file open 40 and the file close 42, as explained with reference to FIG. 1). Other file system operations 20 may include delete or remove, rename, copy, and read for both disk files and file directories. More file system operations 20 may include commands or code for file information, including file accessible, file size, file type, and file information. The kernel 56 of the operating system 28 may notify the eBPF DFA matching software application 74 and/or the cybersecurity agent 30 of any file system operation 20 (such as via a kernel hook 120 and/or a kernel notification 122). The kernel 56 of the operating system 28 may further notify the eBPF DFA matching software application 74 and/or the cybersecurity agent 30 of the filename 48 associated with the file system operation 20 (again, perhaps using the kernel hook 120 and/or the kernel notification 122). Because the eBPF DFA architecture 50 may be used with many different file system operations 20, the eBPF DFA architecture 50 may include a database 124 of the deterministic finite automata (or "DFA"). The electronic database 124 of the DFA may store electronic records of each file system operation 20, each filename 48, and/or the corresponding DFA 52. FIG. 12 illustrates the electronic database 124 as being locally stored in the memory device 32 of the computer system 22. FIG. 13, though, illustrates the electronic database 124 as being remotely stored and accessed via the cloud computing environment 110. FIG. 13, for simplicity, illustrates the electronic database 124 as a network resource maintained by the cloud server 112, but any network member of the cloud computing environment 110 may provide the electronic database 124. Whether the electronic database 124 is locally or remotely accessed, the kernel 56 of the operating system 28 and/or the cybersecurity agent 30 may query the DFA 52 that corresponds to the file system operation 20.

FIG. 14 illustrates more examples of the database 124 of the deterministic finite automata (or "DFA"). The electronic database 124 represents a library or collection of different DFAs 52 and different file system operations 20. The electronic database 124 relates, maps, or associates each different file system operation 20 to its/their corresponding DFA 52. While the electronic database 124 may have any logical and physical structure, a relational database is perhaps easiest to understand. FIG. 14 thus illustrates the electronic database 124 as a table 126 having row and columnar entries that relate, map, or associate each different file system operation 20 to its corresponding DFA 52. So, when the kernel 56 executes the eBPF DFA matching software application 74 in response to the file system operation 20, the eBPF DFA matching software application 74 may query the electronic database 124 for an identifier of the file system operation 20 and identify the particular DFA 52 that is assigned to the file system operation 20. While FIG. 14 only illustrates a simple example of a few entries, in actual practice the electronic database 124 may have many entries that detail a rich depository of different file system operations 20 and their corresponding DFA 52. Once the eBPF DFA matching software application 74 identifies the appropriate DFA 52 that is associated with the file system operation 20, the eBPF DFA matching software application 74 may then compare the characters in the filename 48 (associated with the file system operation 20) to the DFA 52.

The eBPF DFA matching software application 74 may thus access many different DFAs 52. For example, should the eBPF DFA matching software application 74 monitor files being opened, the DFA 52 may represent filenames 48 of the files 24 that are commonly modified by attackers to read passwords. The DFA 52 may represent filenames 48 of the files 24 that are commonly modified by attackers to add users so hackers can later log in. The DFA 52 may thus represent and match any of those file paths. As yet another example, suppose passwords are stored in /etc/passwd. This string may thus be included in the DFA 52 that matches files of interest being opened. If threat actors commonly stored malicious files in /tmp/, the eBPF DFA matching software application 74 may identify and query a different DFA 52 associated with file delete operations 20, thus allowing the eBPF DFA matching software application 74 to catch the threat attackers deleting their equities.

The electronic database 124 may be remotely accessed. The kernel 56 of the operating system 28, and/or the cybersecurity agent 30, may query the DFA 52 that corresponds to the file system operation 20. When the kernel 56 of the operating system 28 notifies the eBPF DFA matching software application 74, and/or the cybersecurity agent 30, of the file system operation 20 (such as via the kernel hook 120 and/or the kernel notification 122), the network resource may be queried. For example, the user-mode portion or components of the cybersecurity agent (illustrated as reference numeral 30b in FIG. 3) may query/retrieve the appropriate eBPF map 54 from the cloud server 112 and synchronize it so that the eBPF DFA matching software application 74 may use it. As another example, the eBPF DFA matching software application 74 may query the network resource (such as the cloud server 112) to identify the correct DFA 52. As FIG. 13 illustrates, as yet another example, the eBPF DFA matching software application 74 and/or the cybersecurity agent 30 may generate and send a DFA query to the IP address associated with the cloud server 112. The DFA query may specify the file system operation 20 as a query parameter. When the cloud server 112 receives the DFA query, the cloud server 112 has a hardware processor and a memory device (not shown for simplicity) that functions as a query handler and performs a database lookup for the DFA 52 associated with the file system operation 20. The cloud server 112 may then generate and send a query response to the IP address associated with the computer system 22, and the query response specifies the DFA 52. The computer system 22 may then separately retrieve the DFA 52. The DFA 52, however, may be included with, or accompanied by, the query response.

Figure 15:
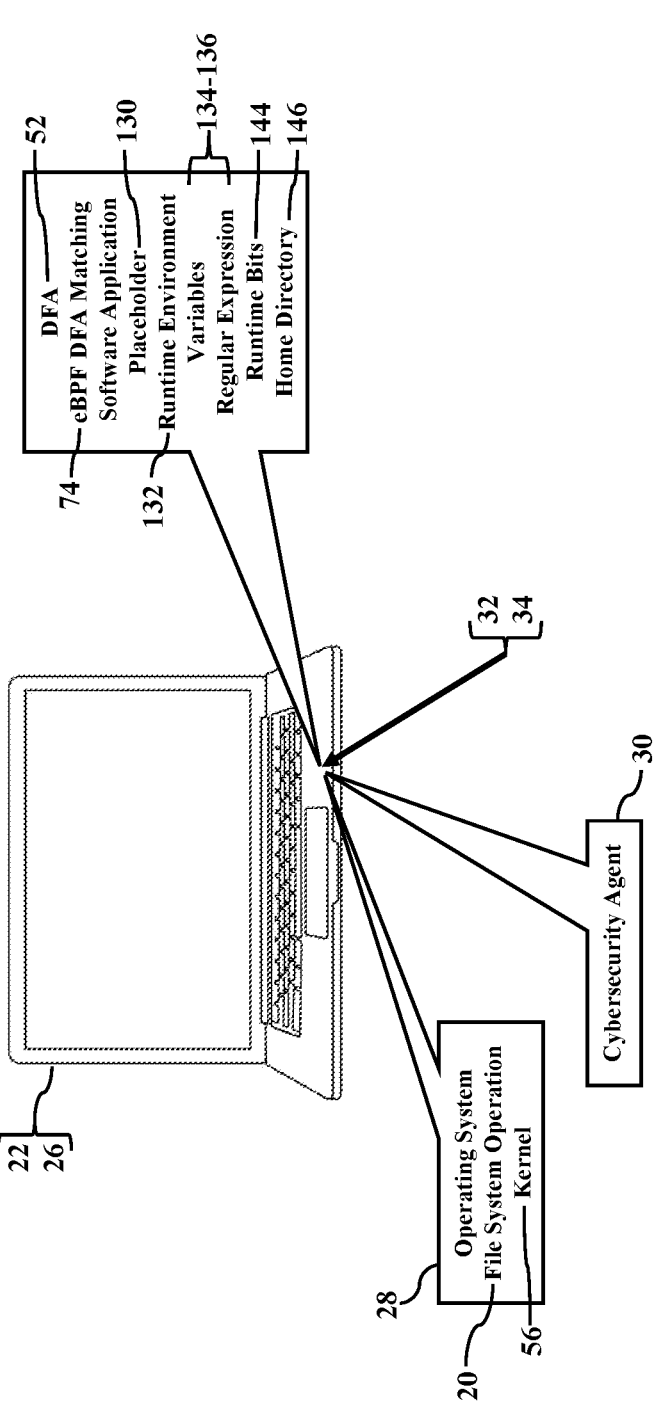
Figure 16:
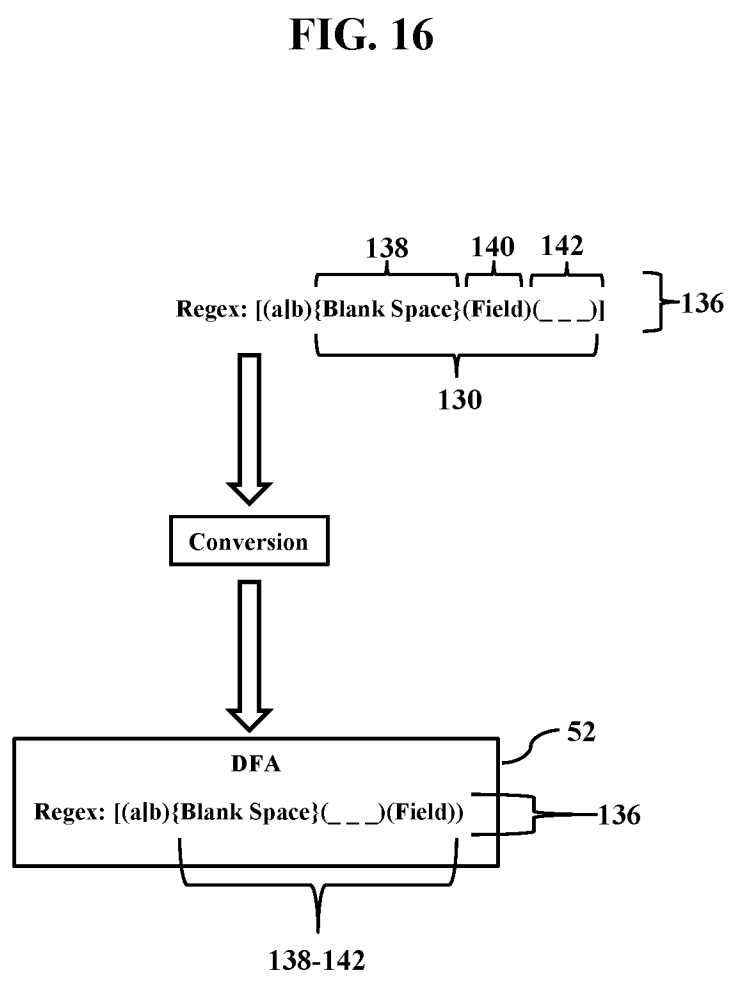

FIGS. 15-16 illustrate examples of runtime populations. When the deterministic finite automata (or "DFA") 52 is generated (whether locally by the computer system 22 or remotely by the cloud computing environment 110, as above explained), the DFA 52 may include one or more runtime placeholders 130 that are populated or filled at a runtime during a runtime environment 132. The DFA 52, in other words, may have variables 134, regular expressions 136, and/or other information that may dynamically change according to the runtime environment 132. While the runtime placeholder 130 may have any structure, FIG. 16 illustrates blank spaces 138, bit fields 140, and/or null/empty bit positions 142. Returning to FIG. 15, as the laptop computer 26 operates in different runtime environments 132, many data values and file locations may change. These values and files may not be known until defined by the operating system 28 and/or until defined by starting some other application. The kernel 56 of the operating system 28, the eBPF DFA matching software application 74, and/or the cybersecurity agent 30 may populate or fill the one or more runtime placeholders 130 with runtime bits 144 defined during the real time runtime environment 132. The DFA 52 may thus behaviorally change with the runtime environment 132. That is, the DFA 52 may still be built or defined ahead of time, but the DFA 52 may incorporate data, files, and other information that are only known later during the runtime environment 132. The DFA 52, in other words, may have a fixed structure or form, but, during operation, the DFA 52 may change its behavior according to the runtime environment 132. The DFA 52 may thus dynamically change according to the runtime environment 132.

As FIG. 15 also illustrates, runtime populations may define a home directory 146. Suppose the regular expression 136 specifies the placeholder 130 as some data associated with a user's home directory 146. The home directory 146 may be defined as a path (such as name and location) by the operating system 28 during the runtime environment 132. The home directory 146, in particular, contains user files that are specific to a current user of the laptop computer 26. However, because the home directory 146 is unknown or undefined prior to the runtime associated with the runtime environment 132, a conventional regular expression cannot be written or defined. The kernel 56 of the operating system 28, the eBPF DFA matching software application 74, and/or the cybersecurity agent 30 may define the home directory 146, and the DFA 52, using the runtime bits 144 defined during the real time runtime environment 132. Once the runtime environment 132 is determined, the runtime bits 144 are acquired and inserted or injected into the runtime placeholder 130 within the home directory 146.

Figure 17:
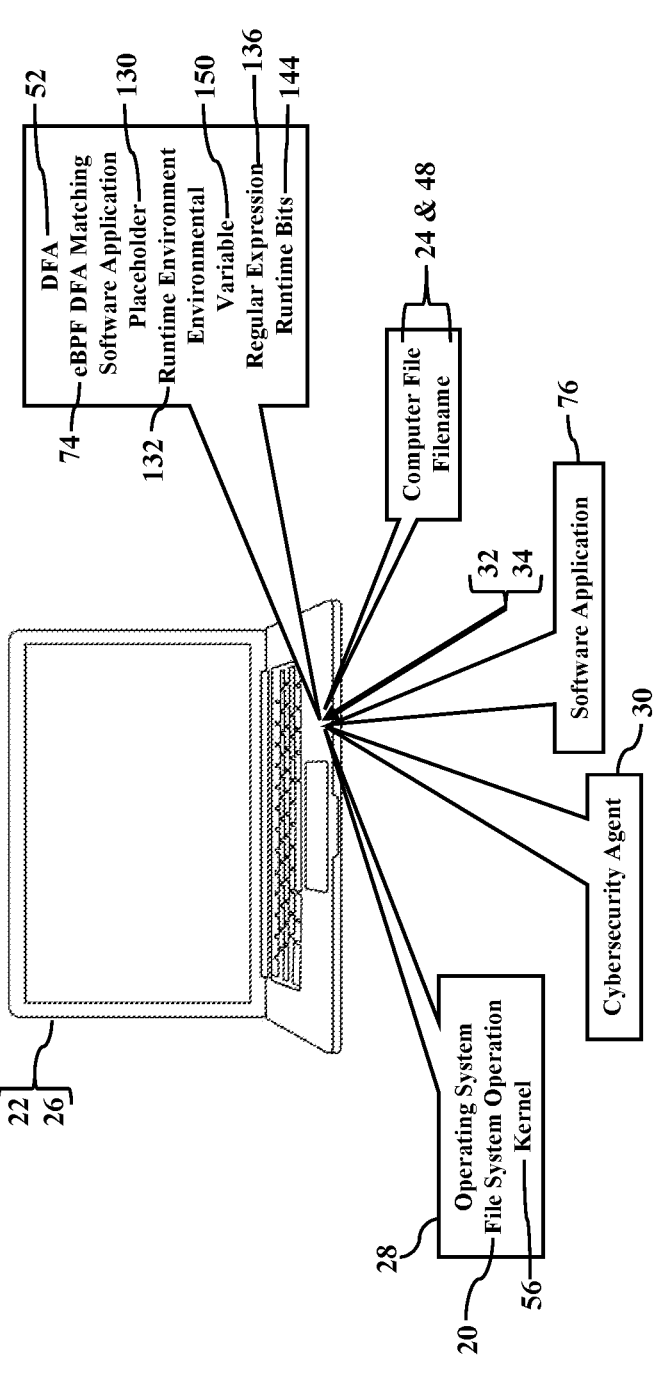
FIG. 17 illustrates examples using environmental variables.

FIG. 17 illustrates examples using environmental variables 150. As the computer system 22 (again illustrated as the laptop computer 26) operates, the environmental variables 150 may change with the runtime environment 132. Each environmental variable 150 may thus be a dynamic-named value that is associated with the runtime environment 132. For example, the DFA 52 may represent the regular expression 136 using a name/location of a temporary (or TEMP) file as the placeholder 130. Other environmental variables 150 may include any values, parameters, or files associated with a home drive or home path, a terminal, a user profile, a registry, and/or a shell. There are numerous environmental variables 150, and the DFA 52 may incorporate any environmental variables 150 specified by the operating system 28. Whatever the environmental variable 150, the DFA 52 may represent the regular expression 136 having the runtime placeholder 130 for the environmental variable(s) 150. Operationally, for example, a memory runtime pointer may track or point to the corresponding environmental variable 150. Once any environmental variable 150 is defined or determined, the eBPF DFA matching software application 74 may acquire the corresponding environmental runtime bit string 144 that represents the environmental variable 150. The eBPF DFA matching software application 74 inserts or injects the environmental bit string 144 into the placeholder 130 within the DFA 52. The eBPF DFA matching software application 74 may thus compare the input string (e.g., the filename 48) to the DFA 52 and generate a decision (such as the filename match 58 or the match failure 60 illustrated in FIG. 2), based on the current runtime environment 132.

Computer functioning is again greatly improved. Because the DFA 52 may reflect the current runtime environment 132 and/or the environmental variables 150, more malicious intrusions or attacks are detected with greater accuracy. Runtime files, APIs, and libraries that are only defined or used at or after the runtime environment 132 may be inspected. The filename inspection engine 72 (such as the hardware processor 34 executing the eBPF DFA matching software application 74) may compare, in real time or near-real time, the input string (e.g., the filename 48) to the DFA 52 populated at the current runtime environment 132. If the filename match 58 is determined, the corresponding computer file 24, file system operation 20, and/or the software application 76 (invoking the computer file 24) may be flagged and even offloaded for further threat analysis. If the filename 48 fails to match the DFA 52, then perhaps the corresponding computer file 24 is safe for opening/accessing/processing.

More computer functioning is greatly improved. The DFA 52 remains deterministic, but the DFA 52 may now perform runtime string interpolation. A conventional DFA, however, must be compiled prior to the runtime of the runtime environment 132. This ahead-of-time compilation requirement makes it impossible to use runtime data that is only available at the runtime. The conventional ahead-of-time DFA compilation model has no knowledge of the runtime context. The DFA 52 may be dynamically populated with the runtime bits 144 only known at the runtime environment 132.

Figure 18:
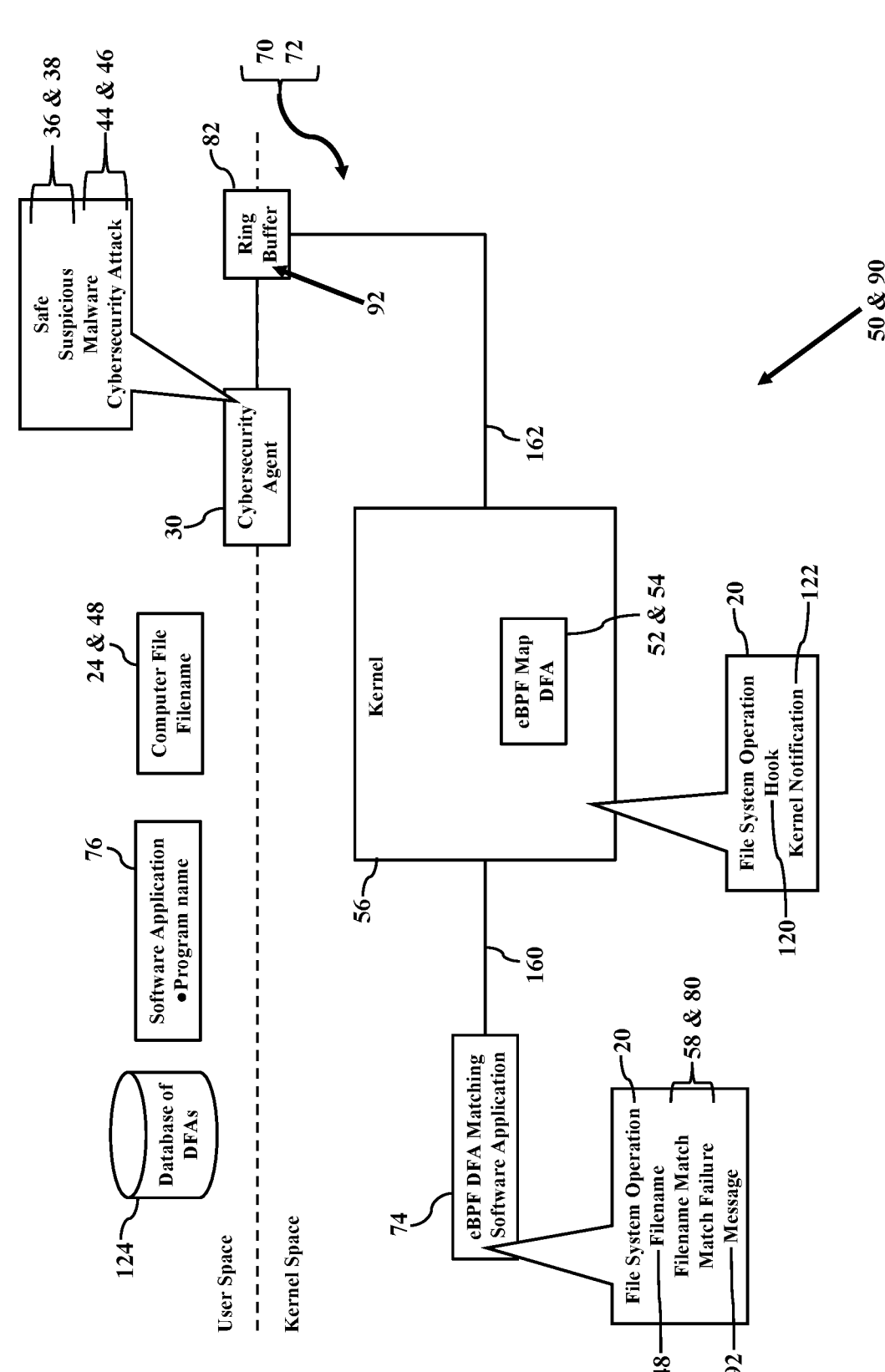
FIG. 18 illustrates examples of notifications associated with the eBPF DFA architecture.

FIG. 18 illustrates examples of notifications associated with the eBPF DFA architecture 50. When any software application 76 requests that the kernel 56 perform the file system operation 20, the kernel 56 may execute the eBPF DFA matching software application 74. The eBPF DFA matching software application 74 instructs or causes the hardware processor 34 to identify the deterministic finite automata (or "DFA") 52 (such as by querying the database 124 of the DFA 52, as previously explained, and if so configured). Once the DFA 52 is identified, the eBPF DFA matching software application 74 instructs or causes the hardware processor 34 to query the DFA 52 for the bit characters associated with the filename 48. The eBPF DFA matching software application 74 may then notify the cybersecurity agent 30 of the filename match 58, or the match failure 80, depending on the whitelist/blacklist/safe/malicious configuration of the DFA 52. The eBPF DFA matching software application 74 may thus interface with the kernel 56 of the operating system 28 and generate alerts, notifications, and/or messages for the cybersecurity agent 30. These alerts, notifications, and/or messages may be sent to the cybersecurity agent 30. These alerts, notifications, and/or messages, however, may be sent to the kernel 56 for forwarding to the cybersecurity agent 30.

Channels may be established. While any mechanism may be used to convey information between the eBPF DFA matching software application 74 and the cybersecurity agent 30, FIG. 18 illustrates a first communications channel 160 that is established between the eBPF DFA matching software application 74 and the kernel 56. FIG. 18 also illustrates a second communications channel 162 that is established between the kernel 56 and the cybersecurity agent 30. The eBPF DFA matching software application 74 may thus generate and send the message 92 via the communications channels 160 and/or 162. While the message 92 may include any electronic content, the message 92 may specify a file system operation identifier that uniquely identifies the file system operation 20 and the filename 48 associated with the file system operation 20. The message or other notification may also specify the program name or other identifier associated with the software application 76 requesting the file system operation 20.

The cybersecurity agent 30 may specify its operational interests. There may be many, perhaps even hundreds, of different file system operations 20. The cybersecurity agent 30 may thus interface with the kernel 56 and establish the kernel notifications 122 for whatever file system operations 20 that are specified by the deterministic finite automata (or "DFA") 52. The DFA 52 may thus specify its file system operations 20. The cybersecurity agent 30 may inspect or read the DFA 52, obtain the file system operations 20 specified by the DFA 52, and then establish the corresponding kernel notifications 122. So, when the kernel 56 is requested to execute any of the file system operations 20 defined by the DFA 52, the kernel 56 may notify the eBPF DFA matching software application 74 and/or the cybersecurity agent 30 (perhaps after querying the DFA 52). The DFA 52 (stored in the BFA map 54) may thus be used to determine whether the eBPF DFA matching software application 74 notifies the cybersecurity agent 30. The DFA 52 may be controlled from the cybersecurity agent 30, thus allowing the cybersecurity agent 30 to instruct the kernel 56 and/or the eBPF DFA matching software application 74 of operational interests. If the eBPF DFA matching software application 74 determines the filename match 58 with the filename 48, the eBPF DFA matching software application 74 may generate and send the message 92 specifying the matching filename 48 and/or the program name or other identifier associated with the software application 76 requesting the file system operation 20. Because the communications channels 160 and 162 may have limited bandwidth, the eBPF DFA matching software application 74 may only specify the file system operation 20 and matching filenames 48 of interest to the cybersecurity agent 30. The cybersecurity agent 30 may further attach a program to a point in the kernel 56 (such as using the kernel hook 120) that corresponds to the file system operation 20. The program contains instructions to execute the eBPF DFA matching software application 74 that queries the DFA 52 when the file system operation 20 is invoked. The cybersecurity agent 30 may then set the DFA 52 to match the data of interest to the cybersecurity agent 30. This way, the registered program may be idle and perhaps do nothing unless the kernel 56 encounters something of interest to the cybersecurity agent 30 (e.g., the filename match 58 with the DFA 52).

The eBPF DFA matching software application 74 may thus notify the kernel 56. The eBPF DFA matching software application 74 notifies the kernel 56 that the message 92 is available for the cybersecurity agent 30 (perhaps using BPF helper functions). The BPF helper functions may also be used by the cybersecurity agent 30 to notify the eBPF DFA matching software application 74 of changes/updates to the DFA 52. That is, the cybersecurity agent 30 may store the DFA 52 in the BPF map 54 for the eBPF DFA matching software application 74 to query, while the eBPF DFA matching software application 74 sends the messages 92 through the ring buffer 82 for the cybersecurity agent 30 to read. The message 92 sent back would be information processed from the kernel notification 122 to the eBPF DFA matching software application 74. Suppose, for example, a program attached to open file operations 20 in the kernel 56 saw the following theoretical sequence of file opens (as seen by the eBPF DFA matching software application 74):

> Open("/home/documents/resume.pdf") [DFA doesn't match]->[ignore/send nothing]
> Open("/tmp/asdj1dpa.bin") [DFA matches/tmp/*. bin]->Send
> (FileName="/etc/asdj1dpa.bin", Time=5:00, Who=BadProcess) to sensor via ringbuffer.
> Open("/home/music/blink-182-feeling-this.mp3") [DFA doesn't match]->[ignore/send nothing].

The eBPF DFA matching software application 74 may thus decide to notify the cybersecurity agent 30. The kernel 56 may merely facilitate notification via the communications channels 160 and 162, as instructed to create/establish by the eBPF DFA matching software application 74 and/or the cybersecurity agent 30. The eBPF DFA matching software application 74 may thus decide to send the message 92, and the kernel 56 may forward the message 92 to the cybersecurity agent 30.

Again, the cybersecurity agent 30 may specify its operational interests. There may be many, perhaps even hundreds, of different file system operations 20. For example, the cybersecurity agent 30 may monitor the files 24 being accessed by the computer system 22, such as a file open event containing the filename 48 and the program name of the software application 76 requesting the event (perhaps also including any other information or fields that are relevant, such as metadata about the computer file 24). The cybersecurity agent 30 may specify and monitor other file system operations 20, such as file notifications for open, delete, rename, close, link, write, and status. The cybersecurity agent 30 may register for event notifications with the eBPF DFA matching software application 74. The event notification may be sent as the message 92 from the eBPF DFA matching software application 74 to the cybersecurity agent 30. The event notification may have data fields containing or specifying data of interest, such as the filename 48 being opened. For a file being renamed, the data fields may specify the old file name and the new file name. The cybersecurity agent 30, however, may specify and monitor non-file-system-related events for programs, memory and networking.

Any file system operation 20 may be suspended. The kernel 56 may hold or delay the file system operation 20 pending the eBPF DFA matching software application 74 query of the DFA 52. If the filename 48 matches the DFA 52, then the corresponding computer file 24 may be categorized as the suspicious 38 and/or the cybersecurity attack 46. When the cybersecurity agent 30 is notified of the filename match 58, the cybersecurity agent 30 may alert the cloud computing environment 110 of the filename match 58, the DFA 52, the filename 48, the file system operation 20, and/or the program name of the computer program resource. As a simple example, the cybersecurity agent 30 may forward the message 92 (perhaps pulled from the ring buffer 82) to the cloud computing environment 110. As another example, the cybersecurity agent 30 may generate and send a custom or different event notification to the cloud computing environment 110 describing the content reported by the message 92. The cybersecurity agent 30 may even instruct the kernel 56 to continue suspending the file system operation 20 pending instructions from the cloud computing environment 110. The cloud computing environment 110, for example, may perform a deeper dive analysis and approve or deny the file system operation 20. A cloud-based analysis, of course, likely introduces delay time, which may prove objectionable. A faster mechanism may merely have the cybersecurity agent 30 instruct the kernel 56 to block any file system operations 20 that match the DFA 52.

Computer functioning is greatly improved. The eBPF DFA architecture 50 allows the eBPF DFA matching software application 74 and/or the cybersecurity agent 30 to monitor any and every interaction with the kernel 56. Every file system operation 20 may be observed and compared to the DFA 52. Bad/Suspicious/Blacklist filenames 48 may be stopped from opening, accessing, or other file system operations 20. The eBPF DFA architecture 50 may run inside or outside the kernel 56, perhaps as the lightweight virtual machine 70. The eBPF DFA architecture 50 may utilize the functional hooks 120 to monitor the file system operations 20. So, when any user-space program requests a resource via a system call, the corresponding functional hook 120 triggers, thus causing the kernel 56 to execute the eBPF DFA matching software application 74 that queries the DFA 52 for the corresponding filename 48. The eBPF DFA architecture 50 may thus monitor any computer files 24 for known or suspicious filenames 48 and cybersecurity attacks 46.

Figure 19:
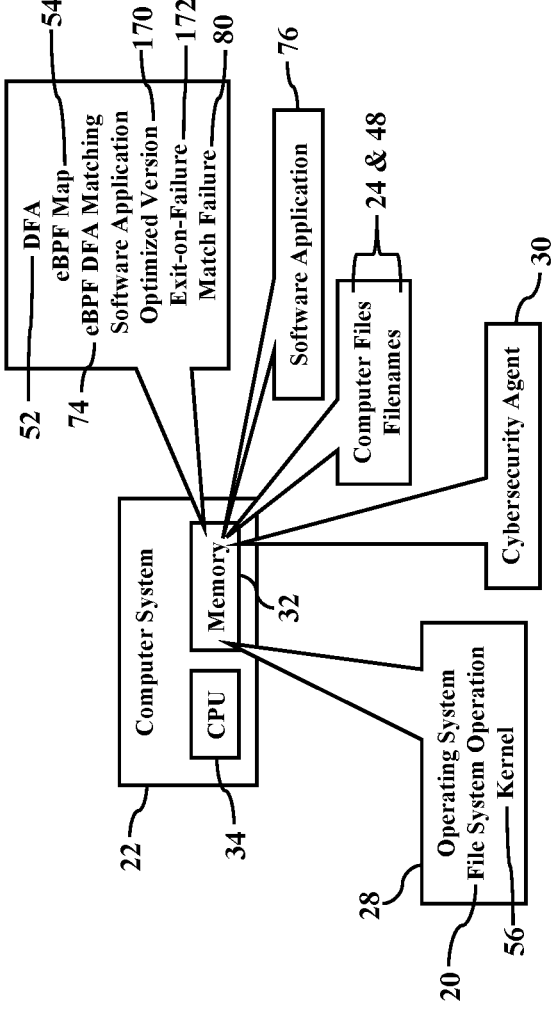
FIG. 19 illustrates examples of optimizations associated with the eBPF DFA architecture.

FIG. 19 illustrates examples of optimizations associated with the BPF DFA architecture 50. The eBPF DFA matching software application 74 may be enhanced to squeeze more invocations into a single query probe. For example, an optimized version 170 of the eBPF DFA matching software application 74 may remove an exit-on-failure check 172. That is, when the filename 48 fails to match the DFA 52 (e.g., the filename match failure 80), the eBPF DFA matching software application 74 may exit the DFA 52 and report the filename match failure 80. However, the optimized version 170 of the eBPF DFA matching software application 74 may remove the exit-on-failure check 172. Even if the filename 48 fails to match the DFA 52 (a failure state), the optimized version 170 of the eBPF DFA matching software application 74 may continue and optimistically keep processing the input string. The optimized version 170 of the eBPF DFA matching software application 74 may thus reduce or completely eliminate branching and, consequently, the number of instructions that are ultimately emulated by a BPF verifier.

The optimized version 170 may thus further improve computer functioning. Even if the filename 48 fails to match the DFA 52 (a failure state), the optimized version 170 of the eBPF DFA matching software application 74 may be more focused on reducing the number of emulated instructions. When the eBPF DFA matching software application 74 is loaded into the kernel 56, the kernel 56 symbolically executes and verifies the entire eBPF DFA matching software application 74. Because the eBPF DFA matching software application 74 queries the DFA 52 for the input characters of the filename 48, the kernel 56 may assume that it's looping over and verifying the entire DFA 52. The kernel 56 thus verifies any additional logic (such as checking if it's in a failed state), when processing each letter drastically increases the number of emulated instructions.

The eBPF DFA matching software application 74 may be custom bytecode designed for verifiability. The eBPF DFA matching software application 74 may be written to bytecode using some other language and compiled into usable bytecode. The kernel may then validate the bytecode within boundaries compile just-in-time before running.

The eBPF DFA architecture 50 may utilize any state machine. The eBPF DFA architecture 50 may apply the DFA 52 to any character or pattern matching scheme. However, the eBPF DFA architecture 50 may be implemented using a non-deterministic finite automata (or NFA) or an extensible finite automata (or eXFA). The eBPF DFA architecture 50, in other words, may be implemented regardless of the state machine. The eBPF DFA architecture 50 may be implemented in any state, node, state transition table, and/or state transition register. The eBPF DFA architecture 50 transitions from a present, initial state to a next, destination state in response to a character or bit associated with the input string representing the filename 48. While the input string may comprise characters from any language, the eBPF DFA architecture 50 may describe the character symbols from the American Standard Code for Information Interchange (or ASCII). A transition from a current character to a subsequent, destination character is governed by the rules or conditions defined according to characters in the filename 48. As each next character (or bit) in the filename 48 is read, the character/bit is compared to the rules/conditions for transitioning from the current state (or character) to a subsequent state (or character). The eBPF DFA architecture 50 may be implemented using the DFA 52, any NFA, and/or any eXFA.

The cybersecurity agent 30 and/or the eBPF DFA matching software application 74 thus provides a nimble and effective endpoint detection and response solution. The cybersecurity agent 30 and/or the eBPF DFA matching software application 74 may be components of an endpoint detection and response tool that detects any nefarious or suspicious activities associated with the filename 48. The cybersecurity agent 30, perhaps functioning as an antimalware driver, may be downloaded and installed to any server, switch, router, smartphone, endpoint device, or any other computer system 22. The cybersecurity agent 30 may instruct the kernel 56 to install the eBPF DFA matching software application 74 (as previously explained). The cybersecurity agent 30 and/or the eBPF DFA matching software application 74 may continuously monitor any computer system 22 to detect and to respond to any event, activity, or operation. The cyber security agent 30, in particular, may monitor for, detect, and/or block suspicious operations, even before online communication is established. The cybersecurity agent 30 and/or the eBPF DFA matching software application 74 provides cyber security service and detects evidence of misappropriation and exfiltration, even while offline. The cybersecurity agent 30 and/or the eBPF DFA matching software application 74 may thus be a local endpoint detection and response (EDR) solution.

The cybersecurity agent 30 and/or the eBPF DFA matching software application 74 may also integrate with an XDR solution. Extended detection and response (XDR) collects threat data from siloed security tools across an organization's technology stack. The cybersecurity agent 30 and/or the eBPF DFA matching software application 74 may upload the filename 48, the filename match 58, and/or the match failure 80 from the host computer system 22 to the cloud-computing environment 110. Any uploaded data may then be unified/merged with other data collected from other platforms, perhaps filtered and condensed into a single console.

Figure 20:
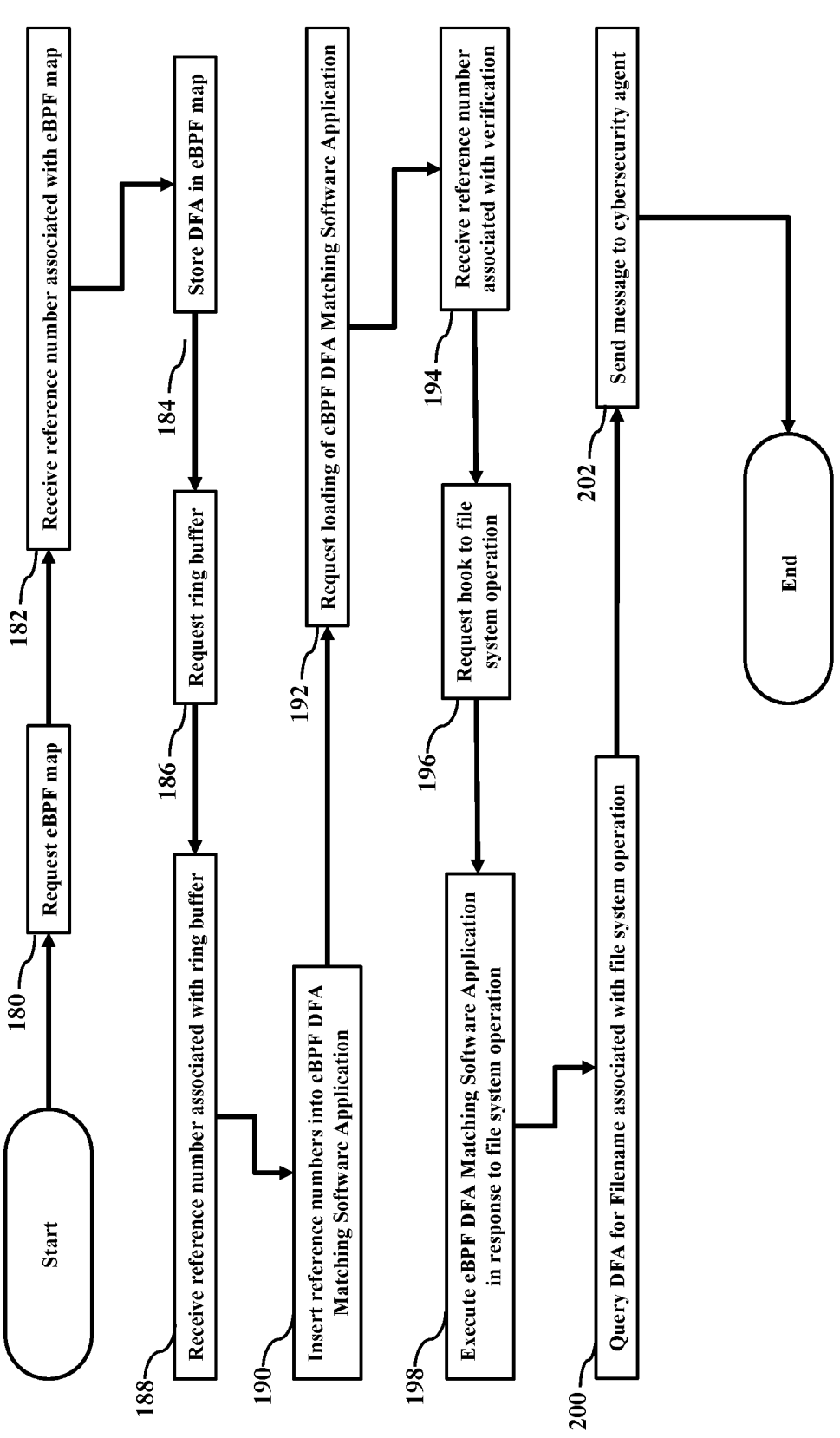
FIG. 20 illustrates examples of a method or operations that improve(s) computer functioning by monitoring the filenames associated with the file system operations.

FIG. 20 illustrates examples of a method or operations that improve(s) computer functioning by monitoring the filenames 48 associated with the file system operations 20. The cybersecurity agent 30 interfaces with the kernel 56 and requests that the kernel 56 create the eBPF map 54 as an array map (Block 180). The kernel 56 return sends a first reference number (#D) to the cybersecurity agent 30 (Block 182). The cybersecurity agent 30 may then store the DFA 52 in the eBPF map 54 perhaps referencing the first reference number (#D) (Block 184). The cybersecurity agent 30 interfaces with the kernel 56 and requests that the kernel 56 create the ring buffer 82 (Block 186). The kernel 56 return sends a second reference number (#R) to the cybersecurity agent 30 (Block 188). The cybersecurity agent 30 loads, patches, or writes the reference numbers (#D and #R) into the eBPF DFA matching software application 74 (Block 190). The cybersecurity agent 30 interfaces with the kernel 56 and requests that the kernel 56 load the eBPF DFA matching software application 74 (Block 192). The kernel 56 verifies the eBPF DFA matching software application 74 and return sends a third reference number (#P) to the cybersecurity agent 30 (Block 194). The cybersecurity agent 30 interfaces with the kernel 56 and requests that the kernel 56 hook or attach the eBPF DFA matching software application 74 to the file system operation 20 perhaps referencing the third reference number (#P) (Block 196). Thus, every time the file system operation 20 is called, the eBPF DFA matching software application 74 is executed (Block 198). The eBPF DFA matching software application 74 queries the DFA 52 for the filename 48 associated with the file system operation 20 (Block 200). The eBPF DFA matching software application 74 sends the message 92 describing a query result (such as the filename match 58 or the match failure 80) (Block 202). GPL libraries may be used, and the eBPF DFA matching software application 74 is efficiently written to ensure the kernel 56 accepts it as sound.

Figure 21:
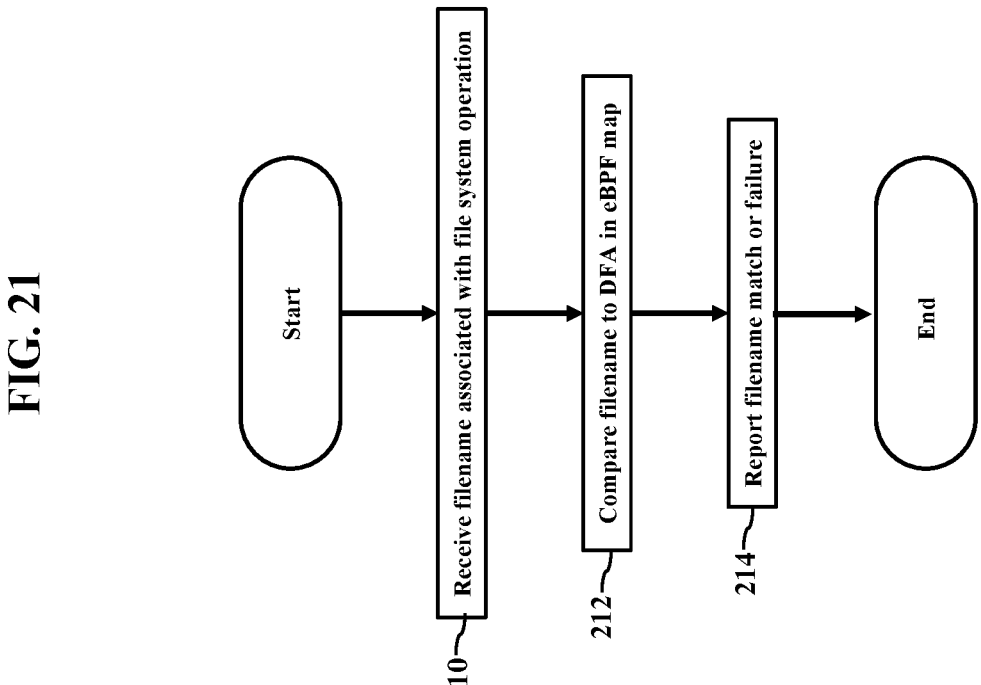
FIG. 21 illustrates examples of a method or operations that detect the filename associated with the file system operation.

FIG. 21 illustrates examples of a method or operations that detect the filename 48 associated with the file system operation 20. The filename 48, associated with the file system operation 20, is received (Block 210). The filename 48 is compared to the deterministic finite automata (DFA) 52 stored as the extended Berkley Packet Filter map 54 (Block 212). The filename match 58 or the match failure 80 is reported (Block 214).

Figure 22:
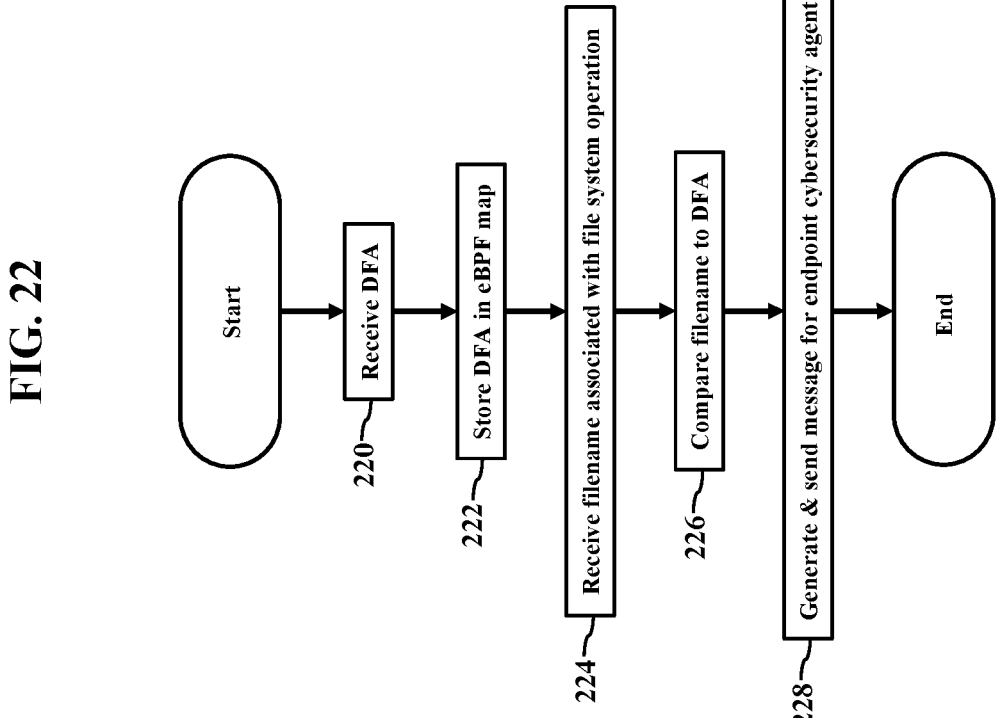
FIG. 22 illustrates examples of a method or operations that notify of the file system operation associated with the filename.

FIG. 22 illustrates examples of a method or operations that notify of the file system operation 20 associated with the filename 48. The deterministic finite automata (DFA) 52 associated with the file system operation 20 is received via the network interface 118 to the cloud computing environment 110 (Block 220). The DFA 52 is stored in the extended Berkley Packet Filter (eBPF) map 54 (Block 222). The filename 48, associated with the file system operation 20, is received (Block 224). The filename 48 is compared to the DFA 52 stored as the eBPF map 54 (Block 226). The message 92 is generated, and the message 92 describes the comparing of the filename 48 to the DFA 52 associated with the file system operation 20 stored in the eBPF map 54 (Block 228).

Figure 23:
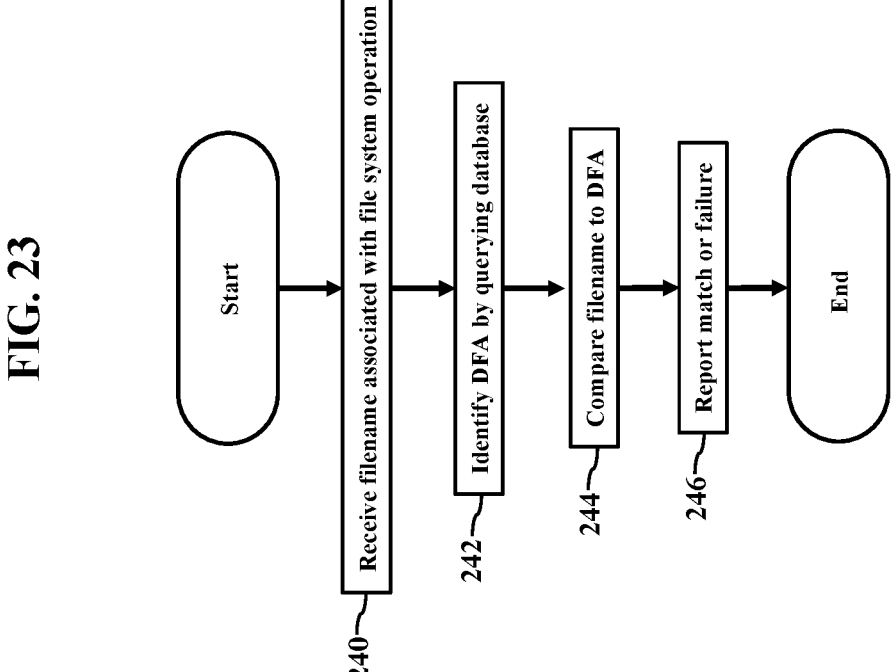
FIG. 23 illustrates examples of a method or operations that report the file system operation called by any software application.

FIG. 23 illustrates examples of a method or operations that report the file system operation 20 called by any software application 76. The kernel 56 notifies the cybersecurity agent 30 and/or the eBPF DFA matching software application 74 of the filename 48 associated with the file system operation 20 (Block 240). With the filename 48 received, the cybersecurity agent 30 and/or the eBPF DFA matching software application 74 identifies the deterministic finite automata (DFA) 52 stored in the extended Berkley Packet Filter (eBPF) map 54 by querying the electronic database 124 of DFAs for the DFA 52 that is associated with the file system operation 20 (Block 242). The filename 48 is compared to the DFA 52 in the eBPF map 54 (Block 244). The filename match 58 or the match failure 80 may be reported (Block 246).

Figure 24:
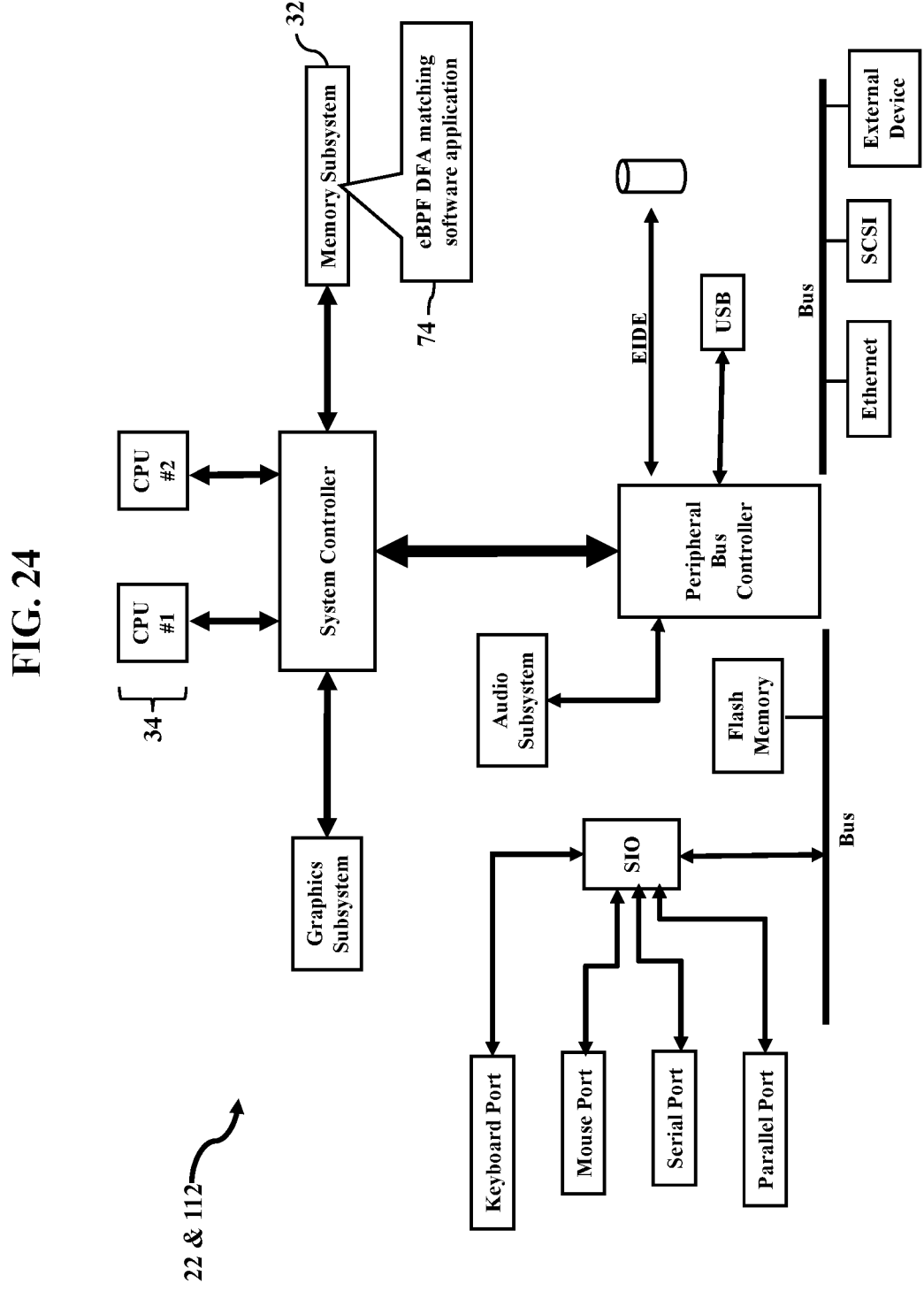
FIG. 24 illustrates a more detailed example of the operating environment.

FIG. 24 illustrates a more detailed example of the operating environment. FIG. 24 is a more detailed block diagram illustrating the computer system 22 (and the cloud server 112 affiliated with the cloud computing environment 110). The eBPF DFA matching software application 74 is stored in the memory subsystem or device 32. One or more of the processors 34 communicate with the memory subsystem or device 32 and execute the eBPF DFA matching software application 74. Examples of the memory subsystem or device 32 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology.

The computer system 22 may have any embodiment. As this disclosure explains, the computer system 22 may be embodied as any processor-controlled information handling system. The computer system 22 may be embodied as the server 100, a switch, a router, a storage component, and/or a management component. The computer system 22 may also be embodied as the smartphone 116, a tablet computer, a smartwatch, a television, an audio device, a remote control, and/or a recorder. The computer system 22 may also be embodied as a smart appliance, such as washers, dryers, and refrigerators. Indeed, as cars, trucks, and other vehicles grow in electronic usage and in processing power, the eBPF DFA matching software application 74 may be easily incorporated into any vehicular controller.

The above examples of the eBPF DFA architecture 50 may be applied regardless of the networking environment. The eBPF DFA architecture 50 may be easily adapted to execute in stationary or mobile devices having wide-area networking (e.g., 4G/LTE/5G cellular), wireless local area networking (WI-FI®), near field, and/or BLUETOOTH® capability. The eBPF DFA architecture 50 may be applied to stationary or mobile devices utilizing any portion of the electromagnetic spectrum and any signaling standard (such as the IEEE 802 family of standards, GSM/CDMA/TDMA or any cellular standard, and/or the ISM band). The eBPF DFA architecture 50, however, may be applied to any processor-controlled device operating in the radio-frequency domain and/or the Internet Protocol (IP) domain. The examples may be applied to any processor-controlled device utilizing a distributed computing network, such as the Internet (sometimes alternatively known as the "World Wide Web"), an intranet, a local-area network (LAN), and/or a wide-area network (WAN). The examples may be applied to any processor-controlled device utilizing power line technologies, in which signals are communicated via electrical wiring. Indeed, the many examples may be applied regardless of physical componentry, physical configuration, or communications standard(s).

The computer system 22 may utilize any processing component, configuration, or system. For example, the examples may be easily adapted to any desktop, mobile, or server central processing unit, graphics processor, ASIC, or chipset offered by INTEL®, ADVANCED MICRO DEVICES®, ARM®, APPLE®, TAIWAN SEMICONDUCTOR MANUFACTURING®, QUALCOMM®, or any other manufacturer. The computer system 22 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When any of the central processing units or chipsets execute instructions to perform "operations," this could include the central processing unit or chipset performing the operations directly and/or facilitating, directing, or cooperating with another device or component to perform the operations.

The examples may inspect packetized communications. When the computer system 22 communicates via any communications network, information may be collected, sent, and retrieved. The information may be formatted or generated as packets of data according to a packet protocol (such as the Internet Protocol). The packets of data contain bits or bytes of data describing the contents, or payload, of a message. A header of each packet of data may be read or inspected and contain routing information identifying an origination address and/or a destination address.

The examples may utilize any signaling standard. The cloud computing environment 110, for example, may mostly use wired networks to interconnect network members. However, the cloud computing environment 110 may utilize any communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/CDMA/TDMA signaling standard. The cloud computing environment 110 may also utilize other standards, such as the I.E.E.E. 802 family of standards, the Industrial, Scientific, and Medical band of the electromagnetic spectrum, BLUETOOTH®, low-power or near-field, and any other standard or value.

The cybersecurity agent 30 and/or the eBPF DFA matching software application 74 may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for monitoring the file system operations 20, as the above paragraphs explain.

The diagrams, schematics, illustrations, and the like represent conceptual views or processes illustrating examples of the eBPF DFA architecture 50. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method executed by a computer system that detects a filename associated with a file system operation, comprising:

prior to executing a file system operation, comparing, by a kernel, the filename associated with the file system operation to a deterministic finite automata (DFA) in an extended Berkley Packet Filter map;

in response to a match associated with the comparing of the filename associated with the file system operation to the DFA in the extended Berkley Packet Filter map, blocking, by the kernel, the file system operation; and in response to a failure associated with the comparing of the filename associated with the file system operation to the DFA in the extended Berkley Packet Filter map, allowing, by the kernel, the file system operation.

2. The method of claim 1, further comprising notifying an operating system.

3. The method of claim 1, further comprising notifying a cyber security agent.

4. The method of claim 1, further comprising generating a message associated with at least one of a ring buffer or a cyber security agent.

5. The method of claim 1, further comprising receiving a kernel notification from an operating system specifying the filename associated with the file system operation.

6. The method of claim 1, further comprising generating a filename message associated with the comparing of the filename associated with the file system operation to the DFA.

7. The method of claim 1, further comprising receiving, by the kernel, a filename message associated with the filename.

8. A computer system that notifies of a file system operation associated with a filename, comprising:

a central processing unit; and a memory device storing instructions that, when executed by the central processing unit, perform operations, the operations comprising:

receiving a deterministic finite automata (DFA) associated with a file system operation via a network interface to a cloud computing environment;

storing the DFA associated with the file system operation in an extended Berkley Packet Filter (BPF) map as a kernel-level filename inspection engine;

comparing, by the kernel-level filename inspection engine, the filename associated with the file system operation to the DFA associated with the file system operation;

blocking, by the kernel-level filename inspection engine, the file system operation in response to the comparing of the filename associated with the file system operation to the DFA associated with the file system operation.

9. The computer system of claim 8, wherein the operations further comprise determining a filename match between the filename and the DFA.

10. The computer system of claim 8, wherein the operations further comprise determining a match failure between the filename and the DFA.

11. The computer system of claim 8, wherein the operations further comprise determining a resource associated with the file system operation.

12. The computer system of claim 8, wherein the operations further comprise determining a program name requesting the file system operation.

13. The computer system of claim 8, wherein the operations further comprise retrieving, by the kernel-level filename inspection engine, a message from a ring buffer representing the blocking of the file system operation.

14. The computer system of claim 8, wherein the operations further comprise queuing a blocking message via a ring buffer representing the blocking of the file system operation.

15. The computer system of claim 8, wherein the operations further comprise notifying the cloud computing environment of the comparing of the filename associated with the file system operation to the DFA.

16. A non-transitory memory device storing instructions that, when executed by a central processing unit, perform operations, comprising:

receiving a filename associated with a file system operation;

identifying a deterministic finite automata (DFA) in an extended Berkley Packet Filter (BPF) map by querying an electronic database for the file system operation, the electronic database having entries that associate different DFA to different file system operations including an entry of the entries that associates the DFA to the file system operation;

comparing the filename associated with the file system operation to the DFA in the extended BPF map; and reporting a match or failure associated with the comparing of the filename associated with the file system operation to the DFA.

17. The non-transitory memory device of claim 16, wherein the operations further comprise receiving at least one of the DFA from a cloud computing environment.

18. The non-transitory memory device of claim 16, wherein the operations further comprise generating a message specifying the match or the failure between the filename associated with the file system operation and the DFA.

19. The non-transitory memory device of claim 18, wherein the operations further comprise associating the message to a cyber security agent.

20. The non-transitory memory device of claim 16, wherein the operations further comprise blocking the file system operation.

\* \* \* \* \*